(12) United States Patent
Nystad et al.

(10) Patent No.: US 8,477,148 B2
(45) Date of Patent: Jul. 2, 2013

(54) GRAPHICS PROCESSING SYSTEMS

(75) Inventors: Jørn Nystad, Trondheim (NO); Rune Holm, Trondheim (NO)

(73) Assignee: ARM Limited, Cambridge (GB)

( * ) Notice: Subject to any disclaimer, the term of this patent is extended or adjusted under 35 U.S.C. 154(b) by 785 days.

(21) Appl. No.: 12/588,177

(22) Filed: Oct. 6, 2009

(65) Prior Publication Data

US 2010/0110093 A1 May 6, 2010

(30) Foreign Application Priority Data

Oct. 6, 2008 (GB) .................................. 0818280.0

(51) Int. Cl.
*G09G 5/02* (2006.01)
*G06T 15/04* (2011.01)
*G06T 15/00* (2011.01)
*G06T 19/00* (2011.01)
*G06T 11/00* (2006.01)
*G06T 15/80* (2011.01)
*G06T 15/50* (2011.01)
*G06T 15/60* (2006.01)
*G06T 17/10* (2006.01)

(52) U.S. Cl.
CPC ............... *G06T 15/04* (2013.01); *G06T 15/005* (2013.01); *G06T 19/00* (2013.01); *G06T 11/001* (2013.01); *G06T 15/80* (2013.01); *G06T 15/503* (2013.01); *G06T 15/60* (2013.01); *G06T 17/10* (2013.01)
USPC ............................ 345/582; 345/419; 345/581

(58) Field of Classification Search
CPC ......... G06T 15/04; G06T 15/005; G06T 19/00; G06T 11/001; G06T 15/80; G06T 15/503; G06T 15/60; G06T 17/10
USPC .......................................... 345/582, 419, 581
See application file for complete search history.

(56) References Cited

U.S. PATENT DOCUMENTS

| 4,855,934 A | 8/1989 | Robinson |
| 5,381,521 A | 1/1995 | Ballard |

(Continued)

FOREIGN PATENT DOCUMENTS

| CN | 101046888 A | 3/2007 |
| CN | 101046888(A) | 3/2007 |

(Continued)

OTHER PUBLICATIONS

Distance approximations for rasterizing implicit curves Gabriel Taubin Jan. 1994 Transactions on Graphics (TOG), vol. 13 Issue 1 Publisher: ACM.*

(Continued)

*Primary Examiner* — Javid A Amini
(74) *Attorney, Agent, or Firm* — Nixon & Vanderhye P.C.

(57) ABSTRACT

A smooth curve is represented in a graphics texture by setting the texels that are inside the curve 80 to a value greater than a predetermined threshold value for the curve 80 and the texels that are outside the curve 80 to a value of less than the threshold value for the curve 80 (or vice-versa).

Such representations of two smooth curves 80, 81 are packed into a single graphics texture (the same texel space) 82 by giving each curve 80, 81 a different threshold value, setting the texel values so that they are appropriately valued with respect to each curve's threshold value, and ensuring that the positions of the threshold value contours of the two curves do not actually overlap each other in the texture.

15 Claims, 7 Drawing Sheets

U.S. PATENT DOCUMENTS

| | | | |
|---|---|---|---|
| 6,552,725 B1 * | 4/2003 | Houtman et al. | 345/423 |
| 7,239,319 B2 | 7/2007 | Loop | |
| 7,277,096 B2 * | 10/2007 | Veach | 345/423 |
| 7,405,733 B2 | 7/2008 | Helie et al. | |
| 7,432,937 B2 | 10/2008 | Poddar et al. | |
| 7,629,400 B2 | 12/2009 | Hyman | |
| 7,657,071 B2 * | 2/2010 | Bartesaghi et al. | 382/128 |
| 7,746,342 B2 * | 6/2010 | Yamada | 345/423 |
| 2002/0158881 A1 | 10/2002 | Van Welzen | |
| 2003/0197708 A1 * | 10/2003 | Frisken et al. | 345/582 |
| 2004/0037467 A1 * | 2/2004 | Wenzel et al. | 382/203 |
| 2004/0189662 A1 * | 9/2004 | Frisken et al. | 345/611 |
| 2006/0017955 A1 | 1/2006 | Owen et al. | |
| 2006/0023933 A1 * | 2/2006 | Mitsui | 382/145 |
| 2006/0133691 A1 * | 6/2006 | Neto et al. | 382/276 |
| 2006/0256112 A1 * | 11/2006 | Heirich et al. | 345/427 |
| 2006/0256115 A1 | 11/2006 | Cao et al. | |
| 2007/0097123 A1 * | 5/2007 | Loop et al. | 345/442 |
| 2007/0211061 A1 * | 9/2007 | Kokojima | 345/441 |
| 2007/0229506 A1 * | 10/2007 | Sugita et al. | 345/441 |
| 2010/0124383 A1 | 5/2010 | Wang et al. | |
| 2011/0109625 A1 | 5/2011 | Yamada | |

FOREIGN PATENT DOCUMENTS

| | | |
|---|---|---|
| CN | 101051390 A | 10/2007 |
| CN | 101189600 A | 5/2008 |
| EP | 0763930 A1 | 3/1997 |
| JP | 2007-073043 | 3/2007 |
| WO | WO 2005/088553 A1 | 9/2005 |
| WO | WO 2007/005537 | 1/2007 |

OTHER PUBLICATIONS

UK Examination Report dated Apr. 8, 2011 for GB 0917509.2.
Office Action mailed Mar. 19, 2012 in co-pending U.S. Appl. No. 12/588,175.
Office Action mailed Jul. 5, 2012 in U.S. Appl. No. 12/588,171.
U.S. Appl. No. 12/588,171, filed Oct. 6, 2009; Inventor: Nystad et al.
U.S. Appl. No. 12/588,172, filed Oct. 6, 2009; Inventor: Nystad et al.
U.S. Appl. No. 12/588,175, filed Oct. 6, 2009; Inventor: Nystad et al.
Search Report, Mar. 17, 2009, in corresponding Great Britain Application No. GB0818278.4.
Search and Examination Report, Jan. 19, 2010, in corresponding Great Britain Application No. GB0917510.0.
Taubin, Distance Approximations for Rasterizing Implicit Curves, ACM Transactions on Graphics, vol. 13, No. 1, Jan. 1994, pp. 3-42.
TASI, Vector Graphics Illustrated Glossary, last reviewed Nov. 2006, pp. 1-6.
TASI, An Introduction to the Vector Image Format, last reviewed Mar. 2005, pp. 1-6.
Huang et al., Implementation of an Open VG Rasterizer with Configurable Anti-aliasing and Multi-window Scissoring, Proceedings of the Sixth IEEE International Conference on Computer and Information Technology, 2006 IEEE.
Loop et al., Resolution Independent Curve Rendering using Programmable Graphics Hardware, Copyright 2005 by Association for Computing Machinery, Inc. pp. 1000-1009.
Search and Examination Report, Jan. 19, 2010, in corresponding Great Britain Application No. GB0917511.8.
Search Report, Mar. 12, 2009, in corresponding Great Britain Application No. GB0818277.6.
Search and Examination Report, Jan. 27, 2010, in corresponding Great Britain Application No. GB0917508.4.
Search Report, Mar. 20, 2009, in corresponding Great Britain Application No. GB0818280.0.
Search Report, Mar. 20, 2009, in corresponding Great Britain Application No. GB0818279.2.
Search and Examination Report, Jan. 26, 2010, in corresponding Great Britain Application No. GB0917509.2.
P. Sen, Silhouette Maps for Improved Texture Magnification, Graphics Hardware (2004), pp. 65-73 and 147.
G. Ramanarayanan et al., Feature-Based Textures, Eurographics Symposium on Rendering (2004), 10 pgs.
wglUseFontBitmaps, 2008 Microsoft Corporation, 3 pgs, http://msdn.microsoft.com/en-us/library/ms537557(VS.85,orinter).aspx.
English Translation of Chinese Office Action mailed Jan. 11, 2013 in Chinese Application No. 200910179092.3.
English Translation of Chinese Office Action mailed Feb. 7, 2013 in Chinese Application No. 200910179578.7.
English Translation of Chinese Search Report mailed Feb. 7, 2013 in Chinese Application No. 200910179578.7.
Z. Su, The Applying Research of Bicubic Patch, Mechanical & Engineering Technology, vol. 32, Issue 6, Dec. 31, 2003, pp. 26-27—No English Translation.
Y. Ke et al., Parallel Scatterplots: Visual Analysis with GPU, Journal of Computer-Aided Design & Computer Graphics, vol. 20, Issue No. 9, Sep. 30, 2008, pp. 1219-1228—Abstract.

* cited by examiner a)
Classification
Result: serpentine curve b)
Texture search
Look through the stored serpentine curves for the closest match c)
Texture selection and texture coordinate calculation d)
Rendering using the selected texture

GRAPHICS PROCESSING SYSTEMS

This application claims priority to United Kingdom Application No. GB 0818280.0 filed 6 Oct. 2008, the entire contents of which is hereby incorporated by reference.

The present invention relates to graphics processing systems and in particular to the rendering of smooth shapes, such as smooth curves in graphics processing systems.

The present invention will be described with particular reference to the processing of three dimensional graphics, although as will be appreciated by those skilled in the art, it is equally applicable to the processing of two-dimensional graphics as well.

As is known in the art, 3D graphics processing is normally carried out by first dividing a scene to be displayed into a number of similar basic components (so-called "primitives") to allow the 3D graphics processing operations to be more easily carried out. These "primitives" are usually in the form of simple polygons, such as triangles.

The primitives for a scene to be displayed are usually generated by the applications program interface for the graphics processing system, using the graphics drawing instructions (requests) received from the application (e.g. game) that requires the display of the graphics.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates) for display.

Once primitives for a scene and their vertices have been generated and defined, they can be processed by the graphics processing system, in order, e.g., to display the scene on an output display device, such as a screen or printer.

This process basically involves determining which sampling points of an array of sampling points covering the scene area to be processed are covered by a primitive, and then determining the appearance each sampling point should have (e.g. in terms of its colour, etc.) to represent the primitive at that sampling point. These processes are commonly referred to as rasterising and shading, respectively.

The rasterising process determines the sample positions that should be used for a primitive (i.e. the (x, y) positions of the sample points to be used to represent the primitive in the scene to be displayed). This is typically done using the positions of the vertices of a primitive.

The shading process then derives the data, such as red, green and blue (RGB) colour values and an "Alpha" (transparency) value, necessary to display the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and shading. However, herein "rasterisation" will be used to refer to converting primitive data to sampling point addresses only.)

These processes are typically carried out by "representing" the sampling points as discrete graphical entities usually referred to as "fragments" on which the graphics processing operations (such as shading) are carried out. Each sampling point will, in effect, be represented by a fragment that will be used to shade the primitive at the sampling point in question. A fragment may represent (have associated with it) a single sampling point or plural sampling points. The "fragments" are the graphical entities that pass through the shading process (the shading pipeline).

(A "fragment" is therefore effectively (has associated with it) a set of primitive data as interpolated to a given screen space sample point or points of a primitive. It may also include per-primitive and other state data that is required to shade the primitive at the sample point or points (fragment position) in question. Each graphics fragment can reasonably be thought of as being effectively equivalent to a "pixel" of the scene as it is processed).

Each graphics "fragment" may correspond to a single pixel (picture element) in the final output display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

It is becoming increasingly desirable in graphics processing systems to be able to render smooth shapes, and in particular shapes that are defined by smooth curves (that have a smooth curve as their edge or boundary), effectively and accurately for display. In general a shape with an edge or boundary curve that is continuous and where the first derivative of the curve is piecewise continuous can be considered to be a smooth shape (a shape defined by a smooth curve) from the point of view of graphics processing (and will be considered to be a smooth shape and, correspondingly, a smooth curve, for the purposes of the present invention and application). Examples of such smooth curves in graphics processing are bezier curves, spline curves and arcs.

For example, in recent years it has become increasingly common to utilise so-called "vector graphics" in computer graphics.

Vector graphics are based on the use of individually defined geometrical objects, such as one or more line segments, e.g. straight lines or curves (such as quadratic (bezier) curves, elliptical arcs, cubic (bezier) curves) that are connected together at anchor points to form a path.

Vector graphics objects/paths are usually defined and manipulated in what is known as "user space". However, in order to display the vector graphics objects/paths on a video display or printer, for example, the user-space defined vector graphics must be converted to a format suitable for a pixel-based display, i.e. to a primitive and sampling point-based form. It can be difficult when performing this conversion to retain any smooth curves or shapes of the vector graphics object, because the object must, in effect, be rasterised to the sampling positions and pixels used for displaying the object.

One known technique for rendering smooth shapes for display is to sub-divide the shape into a large number of small linear sections for the rendering process. However, this has high performance costs, for example, in term of CPU time and rendering bandwidth.

Another known technique for rendering smooth curves is to use implicit curves, i.e. to evaluate an implicit equation for determining whether a given sampling point is inside or outside the curve. However, not all smooth shapes can be converted to such an implicit form, and this technique in any event requires, dedicated rendering hardware or very high precision fragment shader hardware for evaluating the implicit curves.

The Applicants believe therefore that there remains scope for improved techniques and systems for rendering smooth curves and shapes defined by smooth curves.

According to a first aspect of the present invention, there is provided a method of rendering a shape defined by a smooth curve in a graphics processing system, the method comprising:

applying a graphics texture representing a curve corresponding to the curve defining the shape to a primitive or primitives to be rendered by sampling texture values in the texture for sampling positions within the primitive or primitives; and using the sampled texture values to determine which side of the curve the sampling positions should be treated as being on; wherein:

the graphics texture is configured so as to represent two smooth curves by being configured such that all texture positions on one side of a first curve that the texture represents will return sampled texture values that are less than a first threshold value, and all texture positions on the other side of that curve will return sampled texture values that are greater than the first threshold value, and such that all texture positions on one side of a second curve that the texture represents will return sampled texture values that are less than a second, different threshold value, and all texture positions on the other side of that curve will return sampled texture values that are greater than the second threshold value.

According to a second aspect of the present invention, there is provided an apparatus for rendering a shape defined by a smooth curve in a graphics processing system, the apparatus comprising:

means for storing one or more graphics textures that each represent two or more smooth curves, each such graphics texture being configured so as to represent at least two smooth curves by being configured such that all texture positions on one side of a first curve that the texture represents will return sampled texture values that are less than a first threshold value, and all texture positions on the other side of that curve will return sampled texture values that are greater than the first threshold value, and such that all texture positions on one side of a second curve that the texture represents will return sampled texture values that are less than a second, different threshold value, and all texture positions on the other side of that curve will return sampled texture values that are greater than the second threshold value;

means for applying a stored graphics texture representing two or more smooth curves to a primitive or primitives to be rendered by sampling texture values in the texture for sampling positions within the primitive or primitives; and means for using a sampled texture value or values to determine which side of one of the curves the texture represents a sampling position should be treated as being on.

The Applicants have recognised that by configuring a graphics texture such that all texture positions on one side of a curve that the texture represents will return sampled texture values that are less than a particular threshold value, and all texture positions on the other side of the curve will return sampled texture values that are greater than the threshold value, then when the texture is sampled, the sampled texture value can be used to determine whether the sampled point lies inside or outside the curve (i.e. depending upon whether the sampled texture value is greater than or less than (or vice-versa) the curve's threshold texture value).

Thus, in the present invention, a smooth curve is represented as a texture and a shape defined by the smooth curve (i.e., in effect, having the smooth curve as its edge or boundary) is then rendered by applying the texture to an appropriate primitive or primitives. The shape is drawn for display by sampling texture values in the texture and using the sampled values to determine which side of the curve each sampling point is on. This allows the graphics processing system to efficiently determine whether any given point should be treated as being inside or outside the curve (and thus the shape).

By representing the smooth curve in a texture and then applying it to primitives to draw the shape (curve) in this fashion, the present invention provides a technique that can be used for rendering smooth shapes (and smooth curves) using lower cost, and existing and known texture mapping systems and hardware. Thus, as will be discussed further below, the present invention makes it possible to more efficiently render smooth shapes (and curves) using only "plain" texture mapping. The present invention accordingly facilitates the more effective rendering of smooth shapes (and curves) on lower-cost, e.g., fixed function, graphics hardware, and on unmodified, and traditional, existing fixed-function, graphics hardware and can avoid the need, e.g., to use the sub-division technique and/or dedicated hardware currently used for smooth curve rendering.

The Applicants have further recognised that when representing smooth curves in textures in this manner, it is possible by configuring the textures and the curves' threshold values appropriately to represent more than one curve in the same texture space (using the same texels), i.e. to "pack" more than one curve into the texture. In particular, as will be discussed further below, the present invention can and does effectively store multiple smooth curve descriptions on top of each other (using the same texels) in a single texture.

This then allows a given single texture to be used to represent more than one smooth curve, thereby allowing, for example, fewer and/or smaller textures to be needed to represent a given set of smooth curves, and facilitating more efficient texture caching and reduced power consumption when using the textures.

Moreover, this can be achieved without the need to use texture compression methods (which may not always be desirable or suitable for every kind of data).

Furthermore, as will be discussed further below, the present invention can allow the multiple curve descriptions to be packed into a texture whilst still preserving a relatively high amount of the value precision of the individual smooth curve's description (if it were to be represented in a texture individually), as compared, e.g., to the use of straightforward multi-level encoding (which would not retain the same amount of value precision as the present invention).

The sampled texture values are preferably used to determine which side of the curve the sampled position is on by comparing the sampled texture value with the threshold value for the curve. This comparison may be a greater than (">") or a greater than or equal to (">=") comparison (or less than ("<") or less than or equal to ("<=") comparison). In a preferred embodiment, a greater than or equal to (or a less than or equal to) test is used, as that has been found to work better with the rounding performed by typical graphics processors when using the present invention.

Thus according to a third aspect of the present invention, there is provided a method of rendering a shape defined by a smooth curve in a graphics processing system, the method comprising:

applying a graphics texture representing a curve corresponding to the curve defining the shape to a primitive or primitives to be rendered by sampling texture values for sampling positions within the primitive or primitives, the texture being configured so as to represent two smooth curves by being configured such that all texture positions on one side of a first curve that the texture represents will return sampled texture values that are less than a first threshold value, and all texture positions on the other side of that curve will return sampled texture values that are greater than the first threshold value, and such that all texture positions on one side of a second curve that the texture represents will return sampled texture values that are less than a second, different threshold value, and all texture positions on the other side of that curve will return sampled texture values that are greater than the second threshold value; and comparing the sampled texture values for the sampled sampling points of the primitive or primitives to the selected threshold texture value for the curve being rendered to determine which side of the curve the sampled sampling point or points of the primitive or primitives should be treated as being on.

According to a fourth aspect of the present invention, there is provided an apparatus for rendering a shape defined by a smooth curve in a graphics processing system, the apparatus comprising:

means for storing one or more graphics textures that each represent two or more smooth curves, each texture being configured so as to represent at least two smooth curves by being configured such that all texture positions on one side of a first curve that the texture represents will return sampled texture values that are less than a first threshold value, and all texture positions on the other side of that curve will return sampled texture values that are greater than the first threshold value, and such that all texture positions on one side of a second curve that the texture represents will return sampled texture values that are less than a second, different threshold value, and all texture positions on the other side of that curve will return sampled texture values that are greater than the second threshold value;

means for applying a stored texture representing at least two smooth curves to a primitive or primitives to be rendered to render a shape defined by a curve corresponding to one of the smooth curves for display by sampling texture values of the stored texture for sampling positions within the primitive or primitives; and means for comparing the sampled texture values for the sampled sampling points of the primitive or primitives to the threshold texture value for the one of the curves that the texture represents to determine which side of that curve the sampling point or points of the primitive or primitives should be treated as being on.

Similarly, according to a fifth aspect of the present invention, there is provided a method of rendering a shape defined by a smooth curve for display, the method comprising:

generating one or more primitives covering the scene area where the shape is to be displayed;

rasterising the primitive or primitives to generate one or more graphics fragments, each generated fragment representing a sampling point or points covered by the primitive or primitives;

applying a graphics texture that represents a smooth curve corresponding to the smooth curve defining the shape to the generated fragments, the texture being configured so as to represent two smooth curves by being configured such that all texture positions on one side of a first curve that the texture represents will return sampled texture values that are less than a first threshold value, and all texture positions on the other side of that curve will return sampled texture values that are greater than the first threshold value, and such that all texture positions on one side of a second curve that the texture represents will return sampled texture values that are less than a second, different threshold value, and all texture positions on the other side of that curve will return sampled texture values that are greater than the second threshold value, by, for each fragment, sampling a corresponding position or positions in the texture to determine a sampled texture value or values;

comparing the sampled texture value or values for a fragment with the threshold texture value for the curve corresponding to the curve defining the shape to be rendered; and treating the fragment and/or a sampling position or positions represented by the fragment as being either inside or outside the curve on the basis of the comparison.

According to a sixth aspect of the present invention, there is provided an apparatus for rendering a shape defined by a smooth curve for display, the apparatus comprising:

means for generating one or more primitives covering the scene area where the shape is to be displayed;

means for rasterising the primitive or primitives to generate zero or more graphics fragments, each generated fragment representing a sampling point or points covered by the primitive or primitives;

means for applying a graphics texture representing a smooth curve corresponding to the smooth curve defining the shape to generated fragments, the texture being configured so as to represent at least two smooth curves by being configured such that all texture positions on one side of a first curve that the texture represents will return sampled texture values that are less than a first threshold value, and all texture positions on the other side of that curve will return sampled texture values that are greater than the first threshold value, and such that all texture positions on one side of a second curve that the texture represents will return sampled texture values that are less than a second, different threshold value, and all texture positions on the other side of that curve will return sampled texture values that are greater than the second threshold value, by, for each fragment, sampling a corresponding position or positions in the texture to determine a sampled texture value or values;

means for comparing the sampled texture value or values for a fragment with the threshold texture value for the curve corresponding to the curve defining the shape to be rendered; and means for treating the fragment and/or a sampling position or positions represented by the fragment as being either inside or outside the curve on the basis of the comparison.

These aspects of the present invention can and preferably do include any one or more or all of the preferred and optional features of the invention described herein, as appropriate. Thus, for example, the comparison test is preferably a greater than or equal to (or a less than or equal to) test.

It should also be noted here that, as is known in the art, it is possible for the primitive(s) covering the scene area where the shape is to be displayed to rasterise to zero fragments, i.e. effectively meaning that the shape will not be seen in the scene as it is displayed. In this case there will be no fragments for the texture to be applied to. However, typically, the primitives will rasterise to one or more fragments (to at least one fragment) and in this case the texture will then be applied to those fragments as set out above.

The result of the determination of which side of the curve a sampled position is on (e.g. of the comparison test) is preferably used to control future processing of that sampled position. Preferably, the result of the determination is used to, in effect, retain or discard the sampled position from further processing in respect of the smooth shape (curve), as appropriate. Preferably, if the test shows the sampled position is inside the curve, the corresponding position in the primitive is shaded (e.g. coloured) accordingly, but if it is outside the curve, the position in the primitive is not shaded to have the properties required for the smooth shape in question (e.g., and preferably, is discarded from further processing of the shape).

Thus, in a preferred embodiment, the present invention comprises a step of or means for shading the sampling position(s) in accordance with the results of the determination of which side of the curve the sampling position is on (the results of the comparison test).

Thus, for example, and preferably, points determined to be on the inside of the curve preferably have a particular colour and/or appearance applied to them, and points determined to be on the outside of the curve are allowed to have (and have) a different colour applied to them (e.g. a colour that is determined by some other object or shape in the scene).

In other words, the or each sampling position is preferably shaded (coloured) at least in part according to which side of the curve it has been determined to lie on.

The shading may, e.g., be carried out in the same processing pass as the pass in which the texture is applied, or the results of the texture test may be stored (e.g., in the stencil buffer) and the shading then performed in a later pass. In one preferred embodiment, the shading is carried out in a subsequent pass, as this helps when it is necessary to combine both smooth curves and regular polygons (which might intersect and overlap each other).

In a preferred embodiment, there is a single texture look-up per fragment, and the fragment is discarded (or not) as a consequence of the comparison test.

The textures used in the present invention should, as discussed above, represent at least two smooth curves in the manner set out above. A given texture could represent only two smooth curves, but in a preferred textures can represent more than two smooth curves (and in a preferred embodiment one or more of the textures does represent more than two smooth curves). Thus, in general, each texture can represent two or more smooth curves. (It should also be noted here that the present invention does not preclude also storing and using some textures that only represent a single smooth curve or that are configured differently, it is just that there will be at least one texture that represents and can be used to render two (or more than two) smooth curves in the manner of the present invention.)

Where a texture represents more than two smooth curves, then it should be configured similarly for the third (and any subsequent curves), i.e. such that the "third" curve has a third threshold value that is different to the first and second threshold values of the first and second curves that the texture also represents, and such that sampling all texture positions on one side of the third curve that the texture represents will return sampled texture values that are less than that third threshold value, and all texture positions on the other side of the third curve will return sampled texture values that are greater than the third threshold value (and so on for any subsequent (fourth, fifth, etc.) curves).

Thus, in general, the requirement is that the texture represents at least two smooth curves, and each curve that the texture represents will have a curve "threshold" value that is different to the threshold values of the curves that the texture represents, and the texture will be configured such that sampling all texture positions on one side of a respective curve that the texture represents will return sampled texture values that are less than the threshold value for that curve, and all texture positions on the other side of that curve will return sampled texture values that are greater than threshold value for that curve.

The textures that are used to represent the smooth curves (and for rendering smooth shapes) in the present invention can be constructed and configured as desired. As discussed above, each smooth curve should be represented in the texture(s) such that sampling a texture value for a given position in the texture allows the system to determine which side of the curve that position in the texture is on.

In a preferred embodiment, the textures are, as is known in the art, configured as an array of texel values, each texel (texture position) having associated with it a corresponding texture value for that position in the texture map. The texel values of the texels making up the texture should in this arrangement accordingly be selected and set such that when a texture position in the texture is sampled, the sampled texture value can indicate appropriately which side of each curve that the texture represents the texture position is on.

The present invention also extends to the construction of the textures representing the curves and to the textures themselves. It may be, for example, that the textures will be generated (and stored) separately, and/or in advance, and then, e.g., provided to a graphics processor for use. The present invention extends to these activities, as well as to the use of the textures when actually rendering a smooth shape (and curve).

Thus, according to a seventh aspect of the present invention, there is provided a method of generating a texture for use in a graphics processing system for rendering a shape defined by a smooth curve, the method comprising:

generating a graphics texture map comprising an array of texture texels for representing at least two smooth curves, by:

setting the texel values of the texture such that texture samples taken from positions in the texture map that lie on one side of a first smooth curve that the texture is to represent as it appears in the texture will return texture values that are less than a first threshold texture value, and such that texture samples taken from positions that lie on the other side of that smooth curve in the texture will return texture values that are greater than the first threshold texture value, and such that texture samples taken from positions in the texture map that lie on one side of a second smooth curve that the texture is to represent as it appears in the texture will return texture values that are less than a different, second threshold texture value, and such that texture samples taken from positions that lie on the other side of that smooth second curve in the texture will return texture values that are greater than the second threshold texture value.

According to an eighth aspect of the present invention, there is provided an apparatus for generating a texture for use in a graphics processing system for rendering a shape defined by a smooth curve, the apparatus comprising:

means for generating a graphics texture map comprising an array of texture texels for representing two smooth curves, comprising:

means for setting the texel values of the texture such that texture samples taken from positions in the texture map that lie on one side of a first smooth curve that the texture is to represent as it appears in the texture will return texture values that are less than a first threshold texture value, and such that texture samples taken from positions that lie on the other side of that smooth curve in the texture will return texture values that are greater than the first threshold texture value, and such that texture samples taken from positions in the texture map that lie on one side of a second smooth curve that the texture is to represent as it appears in the texture will return texture values that are less than a second, different threshold texture value, and such that texture samples taken from positions that lie on the other side of that second smooth curve in the texture will return texture values that are greater than the second threshold texture value.

According to a ninth aspect of the present invention, there is provided a graphics texture map for use in a graphics processing system for rendering a shape defined by a smooth curve, the texture map comprising:

an array of texture texels, in which:

the texel values of the texture are set such that texture samples taken from positions in the texture map that lie on one side of a first smooth curve that the texture is to represent as it appears in the texture will return texture values that are less than a first threshold texture value, and such that texture samples taken from positions that lie on the other side of that smooth curve in the texture will return texture values that are greater than the first threshold texture value, and such that texture samples taken from positions in the texture map that lie on one side of a second smooth curve that the texture is to represent as it appears in the texture will return texture values that are less than a second, different threshold texture value, and such that texture samples taken from positions that lie on the other side of that second smooth curve in the texture will return texture values that are greater than the second threshold texture value.

As will be appreciated by those skilled in the art, all of these aspects and embodiments of the invention can and preferably do include any one or more or all of the preferred features described herein, as appropriate. For example, the generated texture map or maps are preferably stored for future use.

As noted above, in these aspects and embodiments of the invention the texture map representing the curves is configured such that sampled texture points on either side of a given curve that the texture represents will give sampled texture values either greater than or less than the threshold value for that curve. This means that when the texture is sampled, the sampled texture value can be used to determine whether the sampled point is inside or outside the curve (if the sampled texture value is greater than or less than (or vice-versa) the curve's threshold texture value).

It should be noted here that the aim and intention in all of the aspects and embodiments of the invention is to ensure that all texture positions on one side of a given curve in the texture will return sampled texture values that are less than the selected threshold value for that curve and vice-versa, so as to allow the side of the curve a texture position is on to be readily determined.

However, it may be the case that a sampled texture position will return a value that is equal to a given curve's selected threshold value. Indeed, there will typically be a line of texture positions in the texture that will return sampled texture values that equal a curve's threshold value.

These texture positions that return a curve's threshold value when sampled will accordingly form a contour line in the texture (when it is sampled) on which contour line the sampled texture value for any point on that contour will equal the curve's threshold texture value. This contour in the texture (when it is sampled) will therefore effectively represent, and can therefore effectively be considered as representing, the line of the curve as it will be indicated by the texture (when the texture is sampled) (since sampling a texture position on the curve threshold contour will return the curve's threshold value and so such a position can be viewed as, in effect, lying "on" the curve as it appears in the texture, rather than on one or other side of the curve).

It is accordingly preferred to, as far as possible, configure the texture such that the contour in the texture that corresponds to the threshold value set for a curve matches closely to, and closely represents, preferably as closely as possible, the line of that smooth curve (and thus, in effect, the edge of the smooth shape) that the texture is to represent, as this should then mean that the texture when sampled will more accurately reflect that curve (and shape). This is preferably done for each curve that the texture is to represent.

While it would be possible to treat sample texture positions that are "on" the contour having a given curve's threshold value (i.e. that return the curve's threshold value when sampled) as a special case (for example, to distinguish the line of the curve when it is rendered), in a preferred embodiment this is not done and any texture samples that equal the threshold value are preferably simply dealt with according to the comparison test being employed (e.g. whether it is a "greater than or equal to" test, in which case points "on" the contour of the curve's threshold value will be treated the same as points that are greater than the threshold value, or a "greater than" test, in which case points "on" the contour of the curve's threshold value will be treated the same as points that are less than the threshold value, and so on).

It should also accordingly be noted here that while in general it will be desirable to configure the texture such that positions on the threshold value contour (line) of a and preferably of each curve in the texture will match closely to, and preferably as close as possible to, the line of the curve that the texture is to represent, there is no need to deliberately configure the sampling of the texture such that points on the threshold value contour will be treated as or identified as a special case. Rather, preferably a test is simply made to see whether a sampled position should be treated as being inside or outside the curve.

As discussed above, each of the plural curves that the texture represents will have a different threshold value for testing against to determine which side of the curve the texture position on. Thus, if the texture represents two curves, there will be two different threshold values, if it represents three curves, there will be three different threshold values, and so on.

The texel values for the texture should be set such that they will return values when sampled that indicate the appropriate side of each curve as it is represented in the texture for that texture position. Thus the texels should have values that are appropriately set relative to the threshold value of each curve as it is represented in the texture.

For example, if a texel's position in the texture is inside all of the curves as represented in the texture (or vice-versa), that texel should have a value that is below (or above) the threshold values of all the curves that the texture is to represent.

However, a texel whose texture position is inside one curve as it is represented in the texture but outside another curve as it is represented in the texture, should have a value that is above the threshold value of one of the curves, but below the threshold value of the other curve (i.e. a value that is between the threshold values of the curves), and so on.

The Applicants have recognised that in practice, while it is preferred to set the values of the texels along and around the line of a given curve as it appears in the texture (in practice around the threshold value contour of the curve in the texture) accurately (so that the position of the curve can be accurately indicated when the texture is sampled), the values of the texels that are further from the path of that curve (e.g. more than two texels away from its threshold value contour) are less critical in respect of the curve in question, as those positions should be either fully inside or outside the curve, and so, so long as the texel values at those positions are appropriately above or below the curve's threshold value, their precise values should not adversely affect the definition of that curve's position in the texture.

This means, for example, that the texels further from the path (and thus threshold value contour) of a given curve can have their values set based on the requirements of representing a different curve, having a different threshold value, without adversely affecting the representation of the first curve in the texture. (In practice, as will be appreciated from the above, the threshold value for the different curve should be a value that can be indicated using texel values that are all, e.g., less than (or greater than) the first curve's threshold value (as the texels will all lie on one or other side of the first curve and thus their values must reflect that).)

The Applicants have recognised that the effect of this therefore is that texels further from the path (and threshold value) contour of a given curve in the texture are, effectively, free to encode additional information for indicating the position of (the threshold value contour of) another curve, thereby allowing multiple curves to be represented relatively accurately in the same texture (in the same texture space, using the same texels).

It will accordingly be appreciated that following these principles, a preferred construction for the textures of the present invention is to have a first curve having a first threshold value represented in the texture, and a second curve having a second threshold value that is lower than the first curve's threshold value, whose position is represented in the texture at texture positions that are spaced from the texture positions representing the path of the first curve and on the side of the path of the first curve in the texture that is indicated by sampled texture values that are less than the threshold value of the first curve (i.e. such that the threshold value contour for the second curve appears in the texture at texture positions that are spaced from the texture positions representing the threshold value contour of the first curve and on the side of the path of the first curve in the texture that is indicated by sampled texture values that are less than the threshold value of the first curve).

Similarly, if the texture is to encode (represent) a third curve, that third curve preferably has a third threshold value that is lower than the first and second curves' threshold values, and its path is preferably represented in the texture at texture positions that are spaced from the texture positions representing the paths of the first and second curves and on the side of the paths of the first and second curves in the texture that are indicated by sampled texture values that are less than the threshold values of the first and second curves (i.e. such that the threshold value contour for the third curve appears in the texture at texture positions that are spaced from the texture positions representing the threshold value contours of the first and second curves and on the side of the paths of the first and second curves in the texture that are indicated by sampled texture values that are less than the threshold values of the first and second curves), and so on.

In order to more fully exploit the above observations and possibilities, it is accordingly particularly preferred that the texels that will in practice indicate the positions of the paths of the curves in the texture (in practice, and preferably, those texels that will indicate the threshold value contours of the curves when the texture is sampled namely preferably the texels that lie on the threshold value contours of each of the curves in the texture, and/or that are immediately adjacent to the threshold value contours' positions in the texture) do not overlap each other (are spaced apart) in the texture.

In other words, it is particularly preferred for different sets of texels to indicate the threshold value contours of each different curve that the texture is to represent. (In essence, it is preferred that the threshold value contours of the curves do not overlap each other in the texture).

This then allows the texels that will indicate a given curve's path to be tailored more specifically to the purpose of indicating the position of that curve's path.

Thus, in a particularly preferred embodiment, the texture is configured such that for each curve that the texture represents, the position of the path of that curve as it is represented in the texture does not physically overlap in the texture with the paths of any of the other curves that the texture represents (as they are represented in the texture).

Similarly, most preferably the texture is configured such that for each curve that the texture represents, the (positions of the) texels that will indicate, when sampled, the position of the threshold value contour of the curve as it is represented in the texture do not physically overlap in the texture with the texels that will indicate, when sampled, the positions of the threshold value contours of any of the other curves that the texture represents (as they are represented in the texture).

The particular texels that will indicate the position of the threshold value contour of a curve in the texture when sampled (and thus that preferably should not overlap in the texture) will, as will be discussed further below, depend, for example, on how the texture is to be sampled in use, but they may, for example, and in a preferred embodiment do, comprise texels that lie on and/or immediately adjacent to the contour as it appears in the texture.

For example, where texture filtering, such as bilinear filtering, is to be used to sample the texture in use, the "transition" region around the threshold value contour in the texture of texels that when sampled will indicate the position of that contour in the texture will be greater than if no filtering is used (as in that case there will simply be a single line of texels that will indicate the edge of the shape).

In a particularly preferred embodiment, the texels that, do not overlap in this regard comprise at least, and in one preferred embodiment comprise only, the texels making up each pair of immediately adjacent texels that span or straddle the path (and, preferably, the threshold value contour) of the curve (as it appears in the texture) (i.e., each immediately adjacent pair of texels for which the straight line drawn between the texels (and without intercepting another texel) will be intersected by the path of the curve as it appears in the texture). This is particularly preferred where, as will be discussed further below, the texture is to be sampled in use using bi-linear filtering.

As discussed above, the threshold values used for each curve that the texture is to represent should differ from each other. This is so as to allow the different curves to be distinguished when the texture is sampled.

Moreover, the Applicants have recognised that it is preferable, as will be discussed further below, to use a range of texel values for the texels that will indicate the position of the threshold value contour (path) of a given curve in the texture (as this should, e.g., allow a better definition of the contour's position in the texture).

It is accordingly particularly preferred that the ranges of texel values to be used to denote the threshold value contour of each curve in the texture do not overlap with each other (i.e., the texel values to be used for the texels that will indicate the position of the threshold value contour of a given curve in the texture (as discussed above) do not overlap with the texel values to be used for the texels that will indicate the positions of the other curves that the texture is to represent).

It is similarly accordingly preferred that the threshold values for each curve that the texture is to represent are spaced apart from each other, preferably so far as possible, so that it is possible to allow the maximum ranges of texel values to be used for each curve's threshold value contour without the texel values to be used for one curve overlapping with the texel values used for another curve. In view of this, for a given overall range of available texel values for the texture, the curve threshold values are preferably spaced equally within and across that range, e.g., at ⅓ and ⅔ of the range if two curves are to be represented, at ¼, ½ and ¾ of the range if 3 curves are to be represented, and so on.

In view of the above considerations, a particularly preferred configuration of a texture to be used in the present invention is for the curves that the texture is to represent to be positioned progressively one after another in a spaced-apart fashion as you move from one side of the texture to the other, and for the curves' threshold values to progressively increase (or decrease) as you move from one curve to the next from one side of the texture to the other (preferably in equal steps across the overall available range of texel values).

So long as the above principles are met, the values allocated to the texels of the texture can be set and configured in any suitable and desired manner. For example, any desired range of texel values, and curve threshold texture values, can be used.

The texel values should be denoted using more than one bit. This will allow a finer-grained resolution of the texel values in the texture to be used. Thus, in a preferred embodiment, a greyscale of texel values is used. Preferably 8-bit or 16-bit values are used. Fixed point or floating point textures (texel values) may be used.

In a particularly preferred embodiment, the texel values that can be used in the texture are constrained to an overall range of 0 to 1 ([0, 1]).

In this case, where the texture is to represent two curves, then preferably one curve's threshold value (for fixed point textures at least) is set to ⅓ and the other curve's threshold value is set to ⅔. This spaces the curves' threshold values as far as possible within the range of available texel values, and gives, for example, a range of [0, ⅔] for the texel values for encoding the curve having a threshold value of ⅓ (since 0 is the bottom of the available range, and ⅔ is the threshold for the next curve "up"), and a range of [⅓, 1] for the texel values for encoding the curve having a threshold value of ⅔.

Similarly, if the texture is to represent three curves, then preferably curve threshold values of 0.25, 0.5, and 0.75 (for fixed point texture at least), giving encoding ranges of [0, 0.5], [0.25, 0.75], [0.5, 1], respectively, are used, and so on.

It should be noted here that in the case of floating point textures, where the floating point format has m bits of mantissa and e bits of exponent, then by setting the threshold values for each curve in the texture at $1.5 \times 2^n$ (where n is a positive or negative integer and will have a range depending on the number of bits used for the numbers; for example, for an IEEE floating point format number, n will go from $-2^{e-1}+2$ to $2^{e-1}-1$ (thus $-126 \ldots 0 \ldots 127$ for 32-bit numbers and $-30 \ldots 0 \ldots 31$ for 16-bit floating point numbers), up to $2^e-2$ curves can be stored in the texture, with each having approximately m bits of resolution available for the texel range for each curve (subject to the texels denoting the threshold value contours also preferably not physically overlapping in the texture as discussed above). In other words, for floating point textures, preferably the threshold for each curve is set to the mid-point value in a or each given (different) exponent range. This then allows the full mantissa precision to be used for the texel values used to define each curve's threshold value contour.

The texel values can be allowed to extend over other ranges, and other threshold values can be used, if desired.

The Applicants have recognised that the value returned from a texture map for a given texture sample into that texture will depend upon the texture look-up (sampling) process being used, for example, depending upon whether any form of filtering or interpolation is applied when the texture is sampled. For example, for an identical array of texels, a texture sampling process that uses bi-linear filtering may return a different texel value for a given sampling position as compared to a texture look-up that simply takes the value of the nearest texel to the sampling position.

Moreover, the Applicants have recognised that this can be exploited when constructing the textures representing the smooth curves to be used in the present invention to provide a better rendering result. In particular, the Applicants have recognised that if the texel values in the texture representing the smooth curve are tailored or optimised to the texture sampling process (filtering) to be used when the texture is used, more accurate rendering of the smooth shapes (curves) for a given texture resolution can be achieved.

(It should be noted here that it would always be possible to increase the accuracy of the curve rendering by simply increasing the resolution of the texture. However, that may not always be possible or desirable. The tailoring of the texture to the texture sampling technique to be used provides an alternative way of increasing the rendering accuracy without the need to increase the texture resolution and/or can provide a greater increase in effective texture resolution for a given increase in memory usage).

Thus, in a particularly preferred embodiment, some or all of the texel values of the texture representing the smooth curves are set or selected in accordance with (on the basis of) the texture sampling process that is to be applied to the texture when it is (to be) used to render the smooth curves. Thus, for example, where bi-linear filtering is to be used when sampling the texture in use, texel values stored for the texture are preferably selected such that when bi-linear filtering is used to sample a given position in the texture, an appropriate texture value is returned (to indicate whether the point is inside, or outside, the curves).

In other words, the texture representing the smooth curves is preferably tailored to the texture sampling (interpolation) technique to be used. This will improve the rendering result after the texture filtering (sampling).

Thus according to a tenth aspect of the present invention, there is provided a method of rendering a shape defined by a smooth curve in a graphics processing system, the method comprising:

applying a graphics texture representing a curve that corresponds to the curve defining the shape to a primitive or primitives to be rendered, the graphics texture being configured so as to represent two smooth curves by being configured such that all texture positions on one side of a first curve that the texture represents will return a sampled texture value that is less than a first threshold value, and all texture positions on the other side of that curve will return a sampled texture value that is greater than the first threshold value, and such that all texture positions on one side of a second curve that the texture represents will return a sampled texture value that is less than a second, different threshold value, and all texture positions on the other side of that curve will return a sampled texture value that is greater than the second threshold value, and the values of texels of the texture further being set such that the texture will represent each smooth curve most accurately when the texture is sampled using a particular, selected texture filtering process, by sampling texture values for sampling positions within the primitive or primitives using the particular texture filtering process that the texture is configured for; and when doing, so, comparing the sampled texture values for the sampled sampling points of the primitive or primitives to the threshold texture value for the one of the curves that the texture represents that corresponds to the curve that defines the shape to determine which side of the curve the sampled sampling point or points of the primitive or primitives should be treated as being on.

According to an eleventh aspect of the present invention, there is provided an apparatus for rendering a shape defined by a smooth curve in a graphics processing system, the apparatus comprising:

means for storing one or more graphics textures that each represent two or more smooth curves, the graphics texture or textures being configured so as to represent two or more smooth curves by being configured such that all texture positions on one side of a first curve that the texture represents will return a sampled texture value that is less than a first threshold value, and all texture positions on the other side of that curve will return a sampled texture value that is greater than the first threshold value, and such that all texture positions on one side of a second curve that the texture represents will return a sampled texture values that is less than a second, different threshold value, and all texture positions on the other side of that curve will return a sampled texture value that is greater than the second threshold value, and the values of texels of the texture or textures further being set such that the texture or textures will represent the smooth curves most accurately when sampled using a particular, selected texture filtering process;

means for applying a stored texture representing two or more smooth curves to a primitive or primitives to be rendered by sampling texture values for sampling positions within the primitive or primitives using the particular texture filtering process that the texture is configured for; and means for comparing the sampled texture values for the sampled sampling points of the primitive or primitives to the threshold texture value for the one of the curves the texture represents that corresponds to the curve that defines the shape to be rendered to determine which side of the curve the sampling point or points of the primitive or primitives should be treated as being on.

Similarly, according to a twelfth aspect of the present invention, there is provided a method of rendering a shape defined by a smooth curve for display, the method comprising:

generating one or more primitives covering the scene area where the shape is to be displayed;

rasterising the primitive or primitives to generate one or more graphics fragments, each fragment representing a sampling point or points covered by the primitive or one of the primitives;

applying a graphics texture representing at least two smooth curves to the fragments, the graphics texture being configured so as to represent two smooth curves by being configured such that all texture positions on one side of a first curve that the texture represents will return a sampled texture value that is less than a first threshold value, and all texture positions on the other side of that curve will return a sampled texture value that is greater than the first threshold value, and such that all texture positions on one side of a second curve that the texture represents will return a sampled texture value that is less than a second, different threshold value, and all texture positions on the other side of that curve will return a sampled texture value that is greater than the second threshold value, and the values of texels of the texture further being set such that the texture will represent the smooth curves most accurately when the texture is sampled using a particular, selected texture filtering process, by:

for each fragment, sampling a corresponding position or positions in the texture using the particular texture filtering process that the texture is configured for to determine a sampled texture value or values;

comparing the sampled texture value or values for a fragment with the threshold texture value for the one of the curves that the texture represents that corresponds to the curve that defines the shape to be rendered; and treating the fragment and/or a sampling position or positions represented by the fragment as being either inside or outside the curve on the basis of the comparison.

According to a thirteenth aspect of the present invention, there is provided an apparatus for rendering a shape defined by a smooth curve for display, the apparatus comprising:

means for generating one or more primitives covering the scene area where the shape is to be displayed;

means for rasterising the primitive or primitives to generate zero or more graphics fragments, each generated fragment representing a sampling point or points covered by the primitive or one of the primitives;

means for applying a graphics texture representing at least two smooth curves to generated fragments, the graphics texture being configured so as to represent two smooth curves by being configured such that all texture positions on one side of a first curve that the texture represents will return a sampled texture value that is less than a first threshold value; and all texture positions on the other side of that curve will return a sampled texture value that is greater than the first threshold value, and such that all texture positions on one side of a second curve that the texture represents will return a sampled texture value that is less than a second, different threshold value, and all texture positions on the other side of that curve will return a sampled texture value that is greater than the second threshold value, and the values of texels of each texture further being set such that the texture will represent the smooth curves most accurately when the texture is sampled using a particular, selected texture filtering process, by, for each fragment, sampling, using the particular texture filtering process that the texture is configured for, a corresponding position or positions in the texture to determine a sampled texture value or values;

means for comparing the sampled texture value or values for a fragment with the threshold texture value for a curve that the texture represents that corresponds to the curve that defines the shape to be rendered; and means for treating the fragment and/or a sampling position or positions represented by the fragment as being either inside or outside the curve on the basis of the comparison.

These aspects of the present invention can and preferably do include any one or more or all of the preferred and optional features of the invention described herein, as appropriate. Thus, for example, the comparison test is preferably a greater than or equal to (or a less than or equal to) test. Similarly, the results of the comparison are preferably stored and used to control shading of the fragments and/or sampling positions in a subsequent processing pass (such that, the fragment and/or sampling positions will effectively be retained or discarded as being inside or outside the shape (curve), accordingly).

Similarly, in a preferred embodiment of these aspects of the invention, there is a single texture look-up per fragment, and the fragment is discarded (or not) as a consequence of the comparison test.

Correspondingly, according to a fourteenth aspect of the present invention, there is provided a method of generating a texture for use in a graphics processing system for rendering a shape defined by a smooth curve, the method comprising:

generating a graphics texture map comprising an array of texture texels for representing at least two smooth curves, by:

selecting the texel values to be used for some or all of the texels of the texture on the basis of a particular texture filtering process that is intended to be used when sampling the texture; and setting the texel values for the texture such that:

texture samples taken from positions in the texture map that lie on one side of a first smooth curve that the texture is to represent using the particular texture filtering process will return texture values that are less than a first threshold texture value, and such that texture samples taken from positions that lie on the other side of that smooth curve using the particular texture filtering process will return texture values that are greater than the first threshold texture value; and such that:

texture samples taken from positions in the texture map that lie on one side of a second smooth curve that the texture is to represent using the particular texture filtering process will return texture values that are less than a second, different threshold texture value, and such that texture samples taken from positions that lie on the other side of that smooth curve using the particular texture filtering process will return texture values that are greater than the second threshold texture value.

According to a fifteenth aspect of the present invention, there is provided an apparatus for generating a texture for use in a graphics processing system for rendering a shape defined by a smooth curve, the apparatus comprising:

means for generating a graphics texture map comprising an array of texture texels for representing at least two smooth curves, comprising:

means for selecting the texel values to be used for some or all of the texels of the texture on the basis of a particular texture filtering process that is intended to be used when sampling the texture; and means for setting the texel values for the texture:

such that texture samples taken from positions in the texture map that lie on one side of a first smooth curve that the texture is to represent using the particular texture filtering process will return texture values that are less than a first threshold texture value, and such that texture samples taken from positions that lie on the other side of that smooth curve using the particular texture filtering process will return texture values that are greater than the first threshold texture value; and such that texture samples taken from positions in the texture map that lie on one side of a second smooth curve that the texture is to represent using the particular texture filtering process will return texture values that are less than a second, different threshold texture value, and such that texture samples taken from positions that lie on the other side of that smooth curve using the particular texture filtering process will return texture values that are greater than the second threshold texture value.

According to a sixteenth aspect of the present invention, there is provided a graphics texture map for use in a graphics processing system for rendering a shape defined by a smooth curve, the texture map comprising:

an array of texture texels, in which:

the texel values are set such that:

texture samples taken from positions in the texture map that lie on one side of a first smooth curve that the texture represents will return texture values that are less than a first threshold texture value, and such that texture samples taken from positions that lie on the other side of that smooth curve will return texture values that are greater than the first threshold texture value; and such that:

texture samples taken from positions in the texture map that lie on one side of a second smooth curve that the texture represents will return texture values that are less than a second, different threshold texture value, and such that texture samples taken from positions that lie on the other side of that smooth curve will return texture values that are greater than the second threshold texture value; and in which:

the texel values for some or all of the texels of the texture are further set such that the texture will represent the smooth curves most accurately when the texture is sampled using a particular, selected texture filtering process.

As will be appreciated by those skilled in the art, all of these aspects and embodiments of the invention can and preferably do include any one or more or all of the preferred features described herein, as appropriate.

In these aspects and embodiments of the invention, the texture can be configured for use with any desired texture filtering process. Most preferably, the particular, selected, texture filtering process is an interpolation process, i.e. a filtering process that will interpolate texture values for positions that lie between texels. In general it will be possible to tailor the texel values in the texture to match any texture interpolation (filtering) technique for which the interpolation weights and co-ordinates at any given sampling position are predictable for a particular texel. Thus, in general, any isotropic interpolation process could be used. Thus, for example, the texture could be, and in one preferred embodiment is, tailored (optimised) for use with tri-linear filtering. This would then allow, e.g., the textures representing the smooth curves to be provided in the form of mipmaps.

In a particularly preferred embodiment, the texture representing the smooth curves is tailored (optimised) for sampling using bi-linear filtering. Bi-linear filtering is a commonly available texture sampling technique that also exists in "low-cost", fixed function graphics hardware, and so tailoring the present invention for use with bi-linear filtering enhances its applicability to graphics processors and to lower cost graphics processing hardware in particular.

Thus, in a particularly preferred embodiment, the values of the texels stored in the texture map representing the smooth curves are selected on the basis that bilinear filtering will be used to sample the texture (i.e. such that when bi-linear filtering is used to sample a position in the texture, an appropriate texture value is returned). Similarly, the texture is, preferably sampled using a bi-linear filtering technique when it is being used to render a smooth shape.

Where some form of interpolation or filtering function, such as bi-linear filtering is to be used to sample the texture, and the texels of the texture have a bit resolution greater than 1 (i.e. each texel has multiple bits available to represent its value), such as 8-bit or 16-bit texel values, then that will allow finer-grained resolution of the texel values, and when combined with a corresponding texture filtering process can allow, for example, the returned sampled position values to match the true path of the curve more closely.

It should also be noted here that where the texture is to be sampled using some form of filtering or interpolation process, then while the value of texels on a given side of a particular curve will always be greater than (or less than, respectively) the curve's threshold value, around the threshold value contour of the curve in the texture it can be that texels closer to that contour will have higher (or lower, respectively) values than texels that are on the same side of the curve, but further from the threshold value contour of the curve.

This is because in order for the desired texture value to be returned when a texture position around the line of the curve is sampled using the filtering process, such as bi-linear filtering, it may be necessary for texels on a given side of the curve to have varying values for their side of the curve. Indeed, there may in general be some variation over a range of texel values around the threshold value contour of a given curve, even though the texel values may be uniform at greater distances from the curve's threshold value contour.

Thus, in a particularly preferred embodiment, the texture is constructed such that the texel values in the vicinity of the threshold value contour of each curve vary over a range of values, but texels on a given side of a given curve at a greater distance from the threshold Value contour of the curve each have the same texel value. The extent of the range around the threshold value contour of a curve over which the texel values will vary will depend, e.g., on the size of the filter kernel to be applied when the texture is sampled. Preferably, and for example in the case of bi-linear filtering, the texel values vary for a distance of up to two or up to four texels on each side of the threshold value contour of a (each) curve.

Most preferably all the texels at a greater distance from the threshold value contour of a given curve (until the threshold value contour of the next curve in the texture in that direction, if present, is reached (approached)) are set on one side of that curve to a given value greater than the curve's threshold value (but less than the threshold value of the next curve in that direction (if present)), and all the texels at a greater distance from that curve on the other side of that curve (again until the next curve in that direction, if present, is reached) are set to a given value that is less than the curve's threshold value (but greater than the threshold value of the next curve in that direction (if present)).

Similarly, it is preferred that texels close to the threshold value contour of a curve and on the side of the curve that is to be denoted by texture values less than the curve's threshold value can and do have texel values that are even lower than the texels further from the threshold value contour of the curve on that side of the curve, and vice-versa.

The texture (some or all of the texel values used for the texture) can be optimised or tailored to the texture sampling process to be used, and so that the curves are represented most accurately for that sampling process, in any desired and suitable fashion.

Preferably, the values in the texture are set (calculated) so as to minimise the sum of the (local) errors after sampling with the selected texture sampling process. Thus, in the case of bi-linear filtering, for example, the values used in the texture are preferably set so as to minimise the sum of the (local) errors after bi-linear filtering, rather than, e.g., necessarily aiming to have the correct values at the texel centres.

In a particularly preferred embodiment, the texel values to use are determined and selected (set) by deriving a cost function that can be used to represent the sampling process and then minimising that cost function using one or more optimisation algorithms, such as simulated annealing.

Preferably a set of texel values to use for the texture is determined by minimising a cost function that is representative of respective errors between the position of a (each) curve as it lies in the texture and the indicated position of the (each) curve when the texels of the texture are sampled using a particular texture sampling process.

The optimisation of the texel values is preferably carried out by establishing a cost function that includes the texel values as variables, and then attempting to minimise that cost function and selecting the texel values accordingly. Preferably, the cost function is derived and applied in respect of each curve that the texture is to represent individually.

In a particularly preferred embodiment, some or all of the texel values to use for a given curve that the texture is to represent are determined by (the cost function for deriving the texel values to use is established by) considering the path of the curve in question between texels in the texture and trying to optimise the values of some or all of the texels so as to return (as far as possible) the threshold texture value for the curve at the points where the path of the curve lies between the texels (as this should then ensure that the threshold value contour in the texture matches, so far as possible, the path (line) of the curve in the texture (through the texel array of the texture)).

In a particularly preferred such embodiment, particularly where the texture representing the curve is to be optimised for bi-linear filtering, some or all of the texel values to use are determined by (the cost function for deriving the texel values to use is established by) considering the path of the curve (in the texture) between respective pairs of adjacent texels and trying to optimise the values of the texels in the pair to return the threshold texture value at the point where the curve intersects the line joining the pair of texels.

Thus, in a particularly preferred embodiment, the cost function is generated by breaking the path (line) of a curve that the texture is to represent (through the texel array) into a series of intersections of the path (line) of the curve with lines joining respective texel centres and then trying to adjust the respective texel values so as to produce the desired curve threshold value at the intersection point of the curve with the line joining the respective two texel centres.

This is preferably repeated for each appropriate respective pair of texels for the curve and the overall cost function (optimisation) for all the pairs of texels for the curve determined as a sum of the individual cost functions of each texel pair.

Thus, in a particularly preferred embodiment, some or all of the texel values to use for the texture for a given curve that the texture is to represent are determined using a global cost function which is the sum of local cost functions determined in respect of each relevant texel pair for the curve in question) (preferably each (and only each) texel pair that straddles the path (line) of the curve in the texture (in practice, effectively the threshold value contour in the texture) (since that contour is intended to match the path of the curve)), and then using a global optimisation method to try and find a configuration that minimises the global (overall) error (which in this arrangement will be the sum of the local (individual texel pair's) errors).

This is preferably done for each curve that the texture is to represent.

In these arrangements (and in general), the local cost function (the adjustment of the two texel values) for each respective texel pair is preferably viewed as a series of interconnected optimisation problems.

For the cost function (optimisation) for each texel pair, preferably an or the aim (cost consideration) is to minimise the difference between the actual crossing (intersection) point of the curve on the line joining (between) the pair of texels and the crossing point that will be indicated when the texel values are sampled. (Ideally, sampling the texel values should indicate the true crossing point of the curve, but this may not always be possible, so the aim is to minimise this error.)

This factor is preferably taken account of by including in the cost function the error between the actual crossing point position, and the position as indicated by the texel values.

It is also preferred for the cost function to be configured such that the texel values it produces will use as much of the, and preferably the entire, range (e.g. greyscale) of texel values (e.g. [0, ⅔]) that are available (for the particular curve being represented in the texture in question). This will help to ensure that the threshold value contour of the curve is defined with a higher resolution.

This is preferably achieved, particularly in the above arrangements, by setting the cost function such that the difference in the texel values of the texel pair being considered will reflect the angle that the curve forms relative to the line joining the pair of texels in question. For example, if the curve is perpendicular to the line between the two texels, then, ideally, the difference between the texel values should be equal to the entire available (allowed) range of texel values (e.g. "⅔"). On the other hand if the curve is parallel to the line between the two texels, the difference in the texel values should be "0" (zero).

In a preferred embodiment the cost function uses the sine of the angle between the curve and the line between the two texels as a factor to account for and to try to achieve this.

It is also preferred for the cost functions to be configured to apply less weight to edges where the curve is almost parallel to the line between the pair of texels, as in this case any "errors" when sampling the texel values will not tend to distort the position of the curve as much. This is preferably done by including a factor relating to the square of the sine of the angle between the curve and the line between the texels in the cost function, so as to weight the derived "cost" values appropriately.

This cost function is preferably derived and applied in relation to each appropriate respective pair of texels, and the cost function for each respective pair of texel values defined in this form summed over all the texel pairs being considered (tested), to give an overall or "global" cost function for the curve, which is then minimised using an optimisation algorithm to derive the texel values to use for the curve in question (to find the optimum texel values to use for each texel pair). Any suitable optimisation process can be used, although simulated annealing is preferred.

This process is (preferably) repeated for each curve that the texture is to represent, so that the texel values for each curve are appropriately optimised.

The determined texel values are preferably then stored as a graphics texture representing the smooth curves.

Preferably the cost function in respect of a (each) curve is assessed (and the texel values set accordingly) only in respect of those texels (texel pairs) that will affect the indication of the position of the path of the curve (the threshold value contour) when the texture is sampled (e.g. and, preferably, the respective pairs of (immediately) adjacent texels that span or straddle the position of the threshold value contour (i.e. which the path of the curve passes between)). This is because the other texels (further from the threshold value contour) should not affect the determined indicated position of that contour when the texture is sampled (e.g., and in particular, if bi-linear filtering is used to sample the texture) and can therefore simply be set to a value either above or below the curve's threshold value accordingly, depending on their location.

(Similarly, if the texels used to indicate the path (threshold value contour) for each curve in the texture don't overlap (as discussed above), then each curve can be optimised independently, as each texel being optimised will only participate in indicating the position of its curve (contour), and therefore optimising that curve (its threshold value contour) should not affect the texels used to indicate other curves (their threshold value contours).)

Thus, in a particularly preferred embodiment, the cost function is used to determine (only) the texel values for texels near to a curve's threshold value contour, preferably (only) for the texels adjacent to the curve's threshold value contour, and most preferably (only) for the pairs of immediately adjacent texels that span or straddle the curve's threshold value contour, with the remaining texels (i.e. the texels further from the line of the curve (the threshold value contour)) simply being set to values that are above or below the curve's threshold value, respectively (rather than using a cost function to derive the values to use for those texels).

Similarly, in a preferred embodiment, as discussed above, the path of a given curve in the texture is, in effect, broken into a series of intersections of the curve between respective pairs of texels that straddle the curve, with the adjustment of the two texel values of each pair being treated as a series of interconnected optimisation problems, with any texels further from the curve being set to a value that is above or below the selected threshold value for the curve, as appropriate.

It is similarly particularly preferred that the optimisation or tailoring of the texture to a particular texture sampling (filtering) process (the setting of the texel values on the basis of an intended texture sampling process), is performed (and the texel values set accordingly) only in respect of those texels that will affect the indication of the position of the threshold value contour when the texture is sampled (e.g. and, preferably, the respective pairs of (immediately) adjacent texels that span or straddle the position of that contour (i.e. which the contour passes between)). This is because, as discussed above, the other texels (further from the threshold value contour) should not affect the determined indicated position of that contour when the texture is sampled and can therefore simply be set to a value either above or below the curve's threshold value accordingly, depending on their location.

Thus, in a particularly preferred embodiment, only some but not all of the texel values are specifically set on the basis of the texture sampling process to be used. Most preferably only the texel values for texels near to a curve's threshold value contour, preferably (only) for the texels adjacent to the curve's threshold value contour and most preferably (only) for the pairs of immediately adjacent texels that span or straddle the curve's threshold value contour are specifically set on the basis of the texture sampling process to be used (in the case where the texture is to be sampled using bi-linear filtering at least; other types of filtering may require other texels to be set), with the remaining texels (i.e. the texels further from the line (threshold value contour) of the curve) simply being set to values that are above or below the curve's threshold value, respectively, as discussed above.

Once a texture representing two or more smooth curves in the manner of the present invention has been created, then it can be, and preferably is, stored for future use to render the curves (shapes defined by the curves (having the curves as their edge (boundary))).

The actual use of a texture of the present invention to render a shape defined by a smooth curve that it represents can be done using, for example, any suitable graphics texture mapping process.

As discussed above, in a particularly preferred embodiment, the texture is used to render a smooth shape for display by first generating a primitive or primitives covering the scene area where the shape is to appear, and then applying the texture to the primitive or primitives and shading the primitive or primitives accordingly.

The primitive or primitives may be generated as desired, for example by defining bounding boxes covering the scene area where the shape to be drawn is to appear.

It may be necessary when generating the primitives to ensure that the generated primitive(s) only sample the desired (and appropriate) areas of the texture. (This may particularly be the case where, as will be discussed further below, multiple sets of plural curves are represented in the same texture.) This may be achieved, where necessary, as desired. In a preferred embodiment, primitives that cover the convex hull of the control points for the input curve (shape) to be rendered are generated to try to ensure this. (If necessary, e.g., where one of the two end-points isn't part of the convex hull, the input curve (shape) may be split in two so as to ensure that the line between the two end-points is part of the convex hull.)

The generated primitives are then be rasterised to sampling points and fragments generated, and the texture representing the curves applied to each sampling point (and/or fragment) of the primitive or primitives by sampling positions in the texture corresponding to the primitive sampling point (and/or fragment) positions, as is known in the art. (As discussed above, the texture is preferably sampled using the appropriate texture filtering process, such as, and preferably, bi-linear filtering.)

The sampled texture values are then compared with the threshold value set for the curve in question (i.e., the particular curve of the curves that the texture is to represent that is to be drawn) and the corresponding sampling position(s) and/or fragment(s) retained or discarded accordingly.

This "compare and discard" can be carried out in any desired and suitable manner for the graphics processing system in question.

For example, in a graphics processing system that has programmable fragment shader hardware, a compare and conditional discard routine, with the conditional discard test set to the threshold for the curve in question (e.g.: if (gl_FragColor.a<threshold) discard), could be, and preferably is, used.

With a graphics processing system that has fixed function hardware, the alpha test could be and is preferably used to compare the sampled texture values and to discard sampling points outside the curve. For example, the comparison alpha value for the alpha test could be set to the curve's threshold value, so as to discard sampling points and/or fragments that fall outside the curve.

When using the alpha test for this purpose, if the alpha test must be carried out against a fixed comparison value, e.g., 0.5, for an entire draw call (which may typically be the case, as is known in the art), then in order to test appropriately against the actual threshold value for the curve in question (which may not equal the value set for the alpha test for the draw call), a bias or offset may be and preferably is added to (and/or subtracted from) the sampled texture values to allow for the fact that the alpha test will not test the sampled values against the curve's threshold value, but will test them against the alpha value set for the draw call.

Thus, the sampled texture values are preferably adjusted, if necessary, to allow for the fact that they will not be compared with the actual threshold value of the curve in question (i.e. so as to, in effect, "move" the sampled texture values by the same amount as the curve's threshold value has to be moved to set it to the alpha value (set for the draw call (e.g. 0.5)) that will be used in the alpha test).

For example, for a curve with a threshold value of ⅓ but where the alpha test is set to 0.5, each sampled texture value should have (0.5−(1.0/3.0)) added to it, before it input to the alpha test, to bias (offset) the sampled texture value appropriately for comparison with the draw call alpha value of 0.5, rather than the curve's threshold value of ⅓.

In a particularly preferred embodiment, a given shape (curve) to be drawn is split into two or more separate shapes (curves), and each different part of the shape (curve) is then rendered separately (e.g. using different curve-representing textures or different parts of the same curve texture).

In one preferred embodiment this is done to split shapes defined by curves that have singular points (curves that contain cusps), at the singular point (or points), so as to draw the part of the shape (curve) on each side of the singular point(s) of the curve (geometry) separately. This arrangement can remove the need to have singular points in a curve lie exactly on the texel grid lines in the texture(s) (as discussed below).

(It would also be possible, where a curve to be represented by a texture has a singular point (or points), to configure the texture such that the singular point(s) in the curve lies exactly on the grid lines joining the centres of the texels of the texture (and in one preferred embodiment, this is done). This will ensure that the discontinuous derivative of the singular point lies on the texel "grid" and so may remove the need to split the curve at the "singular point".)

It may also be desirable to split very large shapes into smaller shapes for the rendering process, e.g., to help reduce the number of rendering artefacts.

Similarly, self-intersecting shapes, such as shapes defined by curves with loops in them, could be split into two (or more) shapes that are not self-intersecting, and then be drawn (rendered) separately, so as to facilitate using the techniques of the present invention for such shapes.

In a particularly preferred embodiment, plural different textures, each representing plural different curves and/or plural different parts of a given curve, are generated and stored. Then for any given shape (curve) to be drawn, the texture most appropriate to that shape (curve) can be identified and selected, and used to render the shape (curve). By representing a suitable range of curves in textures, then it should be possible to render almost any arbitrary curved shape.

Indeed, the Applicants have recognised that in practice most if not all curve sections that it may be desired to draw will fall into one of a few families of curves, and so it is possible to represent most if not all of the curves that it may ever be desired to draw using relatively few textures.

In a preferred embodiment, plural sets of plural different curves (each such set representing two or more curves in the manner of the present invention) are stored in the same texture map. This may be done, for example, by spatially separating the sets of curves in the texture, and then sampling the appropriate area in the texture for the set of curves in question.

Where the present invention is to be used, then preferably the texture or textures representing the smooth curves is or are generated in advance, and then suitably stored for use by the graphics processing system, e.g., and preferably, along with other (static) texture maps that the graphics processing system will use. A given application can then call for the texture to be applied when the smooth curve in question (a shape defined by the smooth curve in question) is to be drawn.

The smooth shapes and smooth curves that are represented in a texture in the present invention can comprise any suitable and desired such shapes and curves. As discussed above, in a particularly preferred embodiment each smooth curve is a curve that is continuous and for which the first derivative of the curve (of the path of the curve) is piecewise continuous. Preferably it is also or instead a bezier curve, a spline curve, and/or an arc.

Similarly, the shapes defined by a smooth curve that the present invention is applicable to (and applied to) can be any shape that has a suitable smooth curve as its edge or boundary. Thus, the smooth shapes that are represented in a texture (and rendered using a texture) in the present invention can and preferably do comprise any shape that has as its edge (boundary) a curve that is continuous and for which the first derivative of the curve (of the path of the curve) is piecewise continuous. Preferably the curve defining the shape (defining the edge of the shape) is a bezier curve, a spline curve, and/or an arc.

The Applicants have further recognised that all curves within certain families of curves can be transformed using an affine transformation onto at least a portion of a predefined, single or fundamental reference curve, referred to herein as a "canonical curve". For example, in the case of quadratic curves, any given quadratic curve can be transformed using an affine transformation to the fundamental quadratic curve, $y=x^2$, which accordingly is the "canonical" curve that can be used for quadratic curves.

This therefore allows information about a single curve, i.e. the canonical curve, to be used to determine information about a plurality of smooth curves that may define smooth shapes that are received by the graphics processing system for rendering. In other words, instead of, for example, having to derive or store data in relation to each individual smooth curve that may define a smooth shape that could be received by the graphics processing system for rendering, it is only necessary to derive or store data about the canonical curve. This data can then be used to render shapes defined by each of the individual smooth curves that belong to the family (set) of smooth curves that the "canonical curve" represents.

Thus, in a particularly preferred embodiment a texture or textures that represent plural reference or "canonical" curves are generated and used.

It will be appreciated by those skilled in the art that a given input smooth curve defining a shape to be rendered may not match exactly to the profile of the corresponding smooth curve as it is represented and stored in the texture, for example if the curve defining the shape to be drawn does not match exactly the orientation of the curve as it is represented in the texture. For example, the input shape and thus curve may be rotated or scaled relative to the curve as it is represented in the texture. In these cases, the curve inscribed in the texture will need to be mapped appropriately onto the shape (curve) to be displayed, so as to correctly draw the input shape (curve) as it is to appear on the display.

Such transformation can preferably include using an affine transformation to match the texture to the shape (curve) to be drawn. Thus, in a preferred embodiment, the present invention comprises transforming the texture such that it can be mapped to the shape (curve) to be drawn, before applying the texture.

The process of mapping the curve(s) as they are represented in the textures onto a shape (curve) to be drawn can be carried out in any suitable and desired manner. In a preferred embodiment, the process of mapping the curves inscribed in textures onto the image to be displayed is done by calculating the texture coordinates for the control points defining the input curve to be drawn (the curve defining the shape to be drawn) and then linearly interpolating the texture coordinates over the curve (e.g. using the interpolation hardware of the graphics processor).

The texture coordinates at the control points can be determined as desired, and different methods may be used for different typs of curves, if desired.

For example, in the case of a quadratic curve, each input curve should be just an affine transformed version of the curve stored in the texture. By using the entire curve each time, fixed texture coordinates can be used for each of the control points, and the necessary transform implicitly defined by pairing control points in surface space with the texture coordinates (in texture space).

For cubic curves, the curve is preferably first classified as a serpentine, loop, cusp, "cusp-at-infinity" (i.e. a curve with a cusp with an inflection point infinitely far away), degenerate, or parabola curve. A parabola curve is a quadratic curve and is preferably handled as such. A degenerate curve is preferably handled by splitting it into one or more lines.

For the other curves, the inflection points (infl0 and infl1) of the curve are preferably calculated. Then, if the stored curves are configured so that their inflection points are always at −1 and 1, the linear transformation from [infl0 . . . infl1]→[−1 . . . 1] can be calculated. With this, the parametric location of the start and end point (0 and 1) of the input curve can be transformed to their locations in the texture space. The parametric range in the canonical texture space that the texture needs to cover is now known.

For loop curves and serpentine curves, the stored textures are then searched to find a texture (e.g. the most zoomed-in texture) that covers the parametric range needed. (This is not necessary for cusp and cusp-at-infinity curves.)

The stored curve (with inflection points at −1 and 1) is preferably then rescaled to map the inflection points to the inflection points of the input curve, infl0 and infl1. This transformation is preferably then applied to the control points of the stored curve to give the appropriate transformed control point positions, which can then be and preferably are used as texture coordinates for the corresponding control points of the input curve.

Where multiple sets of curves are spatially packed into a texture, it may be necessary to apply a transformation to the texture coordinates so as to sample the correct (spatial) subset of the texture. This is preferably done by calculating the scaling and translation required to transform the "input" box to the "box" that covers the desired part of the stored texture (i.e. that transforms $[0 \ldots 1] \times [0 \ldots 1] \rightarrow [u\_1 \ldots u\_2] \times [v\_1 \ldots v\_2]$) and then applying the determined transformation to texture coordinates that have been calculated as if the curve covered the entire texture.

As will be appreciated from the above, in a preferred embodiment of the present invention the graphics processing system will receive an input shape defined by a smooth curve (i.e. having a smooth curve as its edge (boundary)) to be rendered for display. The graphics processing system will then identify a texture that represents a curve corresponding to the curve defining the shape to be rendered, derive any necessary mapping or transformation required to match the curve as represented and defined in the texture to the curve that defines the shape to be rendered, and then, using any derived necessary transformation or mapping, use the texture representing the curve that corresponds to the curve defining the shape to be rendered to render the shape in the manner of the present invention.

As will be appreciated from the above, the present invention can effectively draw a shape that has the smooth curve defined in the texture as its edge or boundary (since points on one side of the curve are drawn differently to points on the other side of the curve). The present invention therefore can effectively be used to render shapes that have the relevant curve as their edge or boundary, and/or that have the relevant curve as a contour or boundary (i.e. such that points on different sides of the curve should be drawn differently).

In effect, the present invention can be used to identify points on either side of the curve defining (representing) the edge of the shape, thereby allowing the shape to be drawn efficiently. Thus the textures that are used in the present invention can be viewed as representing curves that define the edges or contours of shapes to be rendered.

Thus the present invention can be used to render (smooth) shapes that have an edge and/or contour curve that is continuous and where the first derivative of the edge or contour curve is piecewise continuous (i.e. shapes that are defined by smooth curves that the present invention can be used to render).

(The textures and techniques of the present invention could also, of course, be used to, in effect, draw the curves themselves, if that was desired, as they do also define the curves themselves.)

In a particularly preferred embodiment, the various functions of the present invention are carried out on a single graphics processing platform that generates and outputs the data that is written to the frame buffer for the display device.

The present invention is applicable to any form or configuration of renderer, such as renderers having a "pipelined" arrangement (in which case the renderer will be in the form of a rendering pipeline). In a preferred embodiment it is applied to a hardware graphics rendering pipeline. The various functions and elements, etc., of the present invention can be implemented as desired, for example, and preferably, by appropriate functional units, processing logic, processors, microprocessor arrangements, etc.

The present invention is applicable to all forms of rendering, such as immediate mode rendering, deferred mode rendering, tile-based rendering, etc. In one preferred embodiment it is used in and for deferred mode rendering and tile-based renderers.

As will be appreciated from the above, the present invention is particularly, although not exclusively, applicable to 3D graphics processors and processing devices, and accordingly extends to a 3D graphics processor and a 3D graphics processing platform including the apparatus of or operated in accordance with any one or more of the aspects of the invention described herein. Subject to any hardware necessary to carry out the specific functions discussed above, such a 3D graphics processor can otherwise include any one or more or all of the usual functional units, etc., that 3D graphics processors include.

The invention similarly extends to a 2D graphics processor and to 2D graphics processing.

Although the present invention has been described above with particular reference to the use of textures to represent smooth curves and smooth shapes for rendering purposes, the Applicants have recognised that the principles of the present invention can be used to pack other forms of data that have "contour" areas and that can be represented as "smooth shapes" in two-dimensional data structures more efficiently.

The present invention accordingly extends to the use of the principles of the present invention for storing and using data other than data representing smooth curves for graphics rendering.

Thus, according to another aspect of the present invention, there is provided a method of generating a two-dimensional data structure for storing information relating to the positions of two or more curves, the method comprising:

generating a two-dimensional data structure comprising a set of values for an array of selected sampling positions within a two-dimensional area for representing the positions of two or more curves, by:

setting the values for sampling positions in the array such that samples taken from positions in the area that the data structure represents that lie on one side of a first curve that the data structure is to represent as it appears in the data structure will return a sampled value that is less than a first threshold value, and such that samples taken from positions that lie on the other side of that curve in the data structure will return a sampled value that is greater than the first threshold value, and such that samples taken from positions in the data structure that lie on one side of a second curve that the data structure is to represent as it appears in the data structure will return a sampled value that is less than a different, second threshold value, and such that samples taken from positions that lie on the other side of that second curve in the data structure will return a sampled value that is greater than the second threshold value.

Similarly, according to another aspect of the present invention, there is provided an apparatus for generating a two-dimensional data structure for storing information relating to the positions of two or more curves, the apparatus comprising:

means for generating a two-dimensional data structure comprising a set of values for an array of selected sampling positions within a two-dimensional area for representing the positions of two or more curves, by:

setting the values for the sampling positions in the array such that samples taken from positions in the area that the data structure represents that lie on one side of a first curve that the data structure is to represent as it appears in the data structure will return a sampled value that is less than a first threshold value, and such that samples taken from positions that lie on the other side of that curve in the data structure will return a sampled value that is greater than the first threshold value, and such that samples taken from positions in the data structure that lie on one side of a second curve that the data structure is to represent as it appears in the data structure will return a sampled value that is less than a different, second threshold value, and such that samples taken from positions that lie on the other side of that second curve in the data structure will return a sampled value that is greater than the second threshold value.

According to a further aspect of the present invention, there is provided a two-dimensional data structure for storing information relating to the positions of two or more curves, comprising:

a set of values for an array of selected sampling positions within a two-dimensional area, in which:

the values for the sampling positions in the array are set such that samples taken from positions in the area that the data structure represents that lie on one side of a first curve that the data structure is to represent as it appears in the data structure will return a sampled value that is less than a first threshold value, and such that samples taken from positions that lie on the other side of that curve in the data structure will return a sampled value that is greater than the first threshold value, and such that samples taken from positions in the data structure that lie on one side of a second curve that the data structure is to represent as it appears in the data structure will return a sampled value that is less than a different, second threshold value, and such that samples taken from positions that lie on the other side of that second curve in the data structure will return a sampled value that is greater than the second threshold value.

As will be appreciated by those skilled in the art, these aspects and embodiments of the present invention can, and preferably do, include, as appropriate, any one or more or all of the preferred optional features of the invention described herein. Thus, for example, the data values are preferably tailored to a particular data sampling scheme to be used. Similarly, the curves are preferably arranged in the data structure such that they do not overlap in their positions in the data structure, and are preferably (smooth) curves of the form discussed above. The data structure is preferably a graphics texture.

It will further be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processor may be a microprocessor system, a programmable FPGA (field programmable gate array), etc.

The invention also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which:

FIG. 8b shows schematically how the texel values will vary across the texture shown in FIG. 8a.

As discussed above, a basic premise of the present invention is to represent a smooth curve in a texture, such that sampling the texture on one side of the curve will give a sampled texture value lower than a particular threshold value, and sampling the texture on the other side of the curve will give a sampled texture value that is greater than the particular threshold value.

The principles of this and of how to generate the texture will first be described for explanatory purposes in relation to a single smooth curve, and then the packing of two or more such smooth curves into a single texture in accordance with the present invention will be described.

Figure 1:
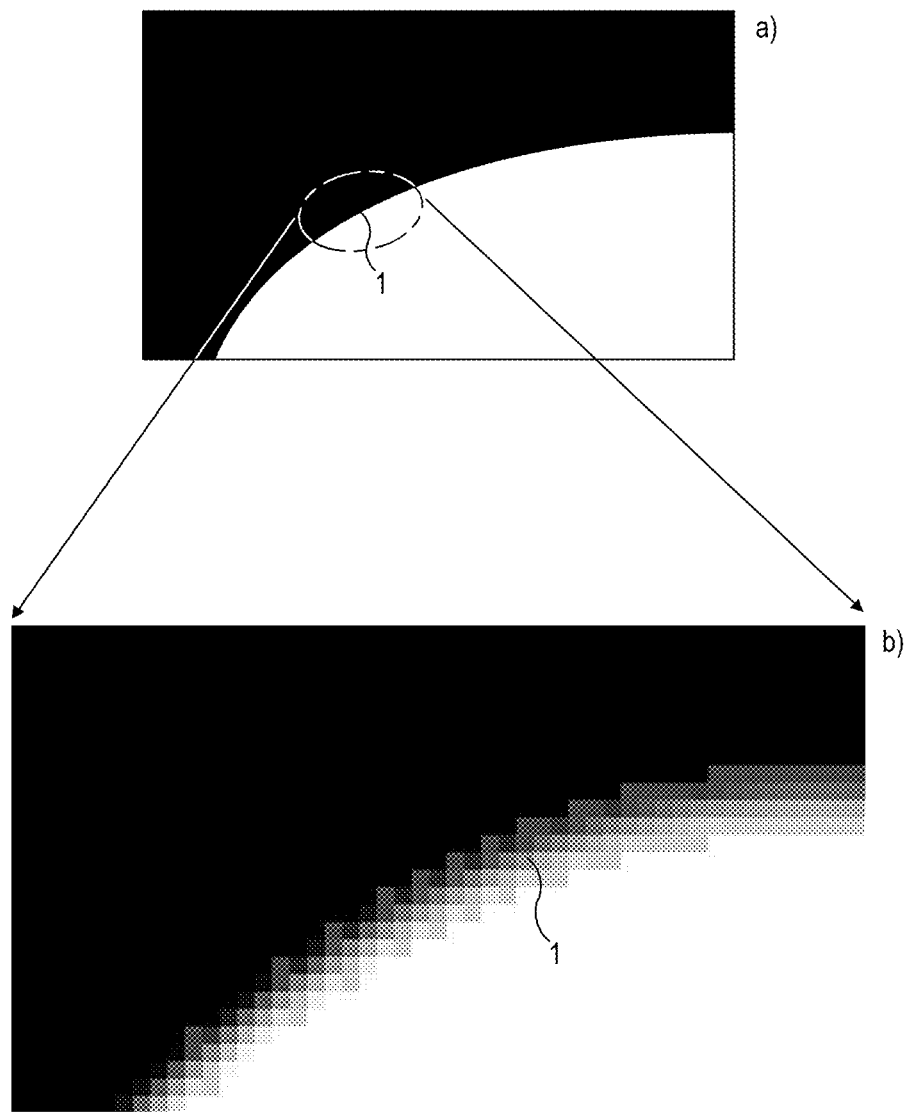
FIG. 1 shows schematically a representation of a smooth curve in a texture that is used in the present invention.

FIG. 1 shows an arrangement of such a texture for representing a smooth curve 1.

FIG. 1a) shows the overall texture at a lower resolution and basically illustrates the principle of having texture positions to each side of the curve 1 set to, and return, different texture values. FIG. 1b) shows an enlarged view of the texture of FIG. 1a) around the line of the curve 1 as it appears in the texture, and shows, in particular, how the texel values vary in the vicinity of the curve 1 as it appears in the texture.

As shown in FIG. 1, texels that are inside the curve 1 are set to a value of greater than "0.5" (a value of "1" is shown as white in FIG. 1) and texels that are outside the curve 1 are set to a value of less than "0.5" (a value of "0" is shown as black in FIG. 1). Thus, when a sampling position in the texture is looked up, the texture value returned for the sampled position can be used to determine whether the sampled position is inside the curve 1 or not. In effect, the threshold value for the curve 1 can be considered to be 0.5.

(It will be appreciated that the texture shown in FIG. 1 can equally be used to draw the "reverse" or inverse curve or shape, so that "black" is treated as being "inside" the curve and "white" is treated as being outside the curve. Indeed; in a preferred embodiment, the graphics system is configured so as to be able to do this. This may be done, e.g., by subtracting the sampled texture value from twice the threshold value for the curve (i.e. by taking 2*threshold (which gives 1.0 in the present case)−sampled_texture_value) and then comparing that value with the threshold value (which will, in effect, "flip" the meaning of the texture).)

The texture shown in FIG. 1 is an 8-bit texture (i.e. uses 8-bits to represent each texel value). Each texel has a single value associated with it (and so the texture may conveniently be a single channel texture).

In this arrangement, the texels in the texture are allowed to have values falling in the range 0 to 1 (inclusive), and the threshold value for the curve contour is set to 0.5. Other arrangements are, of course, possible.

Figure 4:
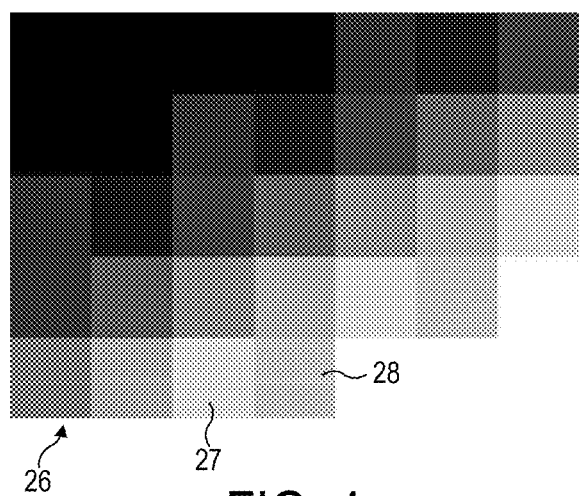
FIG. 4 shows schematically an enlarged section of the contour region of the curve in the texture of FIG. 1.

FIG. 4 shows schematically an enlarged section 24 of the curve contour region 26 of the curve 1 stored in the texture shown in FIG. 1. As can be seen, the texel values around the contour 26 vary to either side of the curve's contour, including some texels 27 closer to the contour 26 of the curve that have higher (lighter) values than texels 28 that are further from the curve contour 26 on the side of the curve that is represented by values higher than the curve's threshold value, and vice-versa. This is so as to ensure that, as will be discussed further below, when the curve is bi-linearly sampled, the desired texture values are returned.

As discussed above, in the present invention, representations of two or more smooth curves in the manner of the arrangement shown in FIG. 1 are packed into a single texture (i.e. represented using the same set of texels).

The Applicants have in particular recognised that while the exact value of texels around and along the path or line of a given curve to be represented in the texture may be important for indicating the position of the curve correctly when the texture is sampled, the value of texels further away from the curve's path, i.e., which are either fully inside or outside the curve, are not so important, so long as the values of those texels are either all above the threshold value for the curve (e.g., when outside of the curve or vice-versa) or all below that threshold value (e.g., when inside the curve or vice-versa). This means that so long as these requirements are met, the texels further from the curve can have their values varied so as to provide additional information, such as, and in particular, information for indicating the position of the path (line) of another curve in the texture.

Figure 8A:
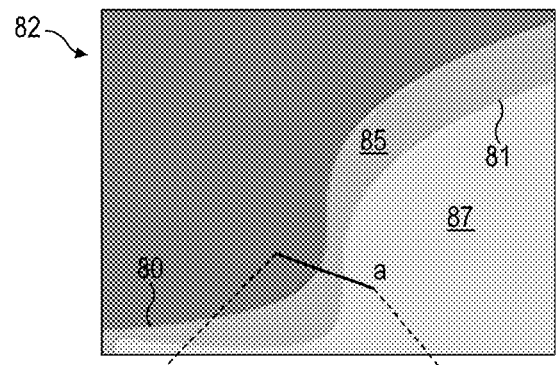
FIG. 8a shows schematically the packing of two smooth curves into a single texture in accordance with the present invention.

FIG. 8a illustrates this, and shows representations of two smooth curves 80, 81 packed into a single texture (the same texel space) 82.

The different shades used in FIG. 8a represent different texel values within the texture. The range of permitted texel values for the texture 82 is 0 to 1.

As shown in FIG. 8a, the first curve 80 represented in the texture has a first, lower threshold value, namely ⅓ in the present embodiment, and the second curve 81 has a higher threshold value, namely ⅔ in the present embodiment.

This means that it is possible, inter alia, to use a range of texel values to denote the position of the path of the curve 81 without those texel values falling below the threshold value for the curve 80 (which could then result in false readings when sampling the texture to draw the curve 80), and vice versa. (In effect, a range of texel values can be used for denoting the path of each curve 80, 81, so long as those texel values do not fall to the wrong side of the threshold value for the other curve).

Figure 8B:
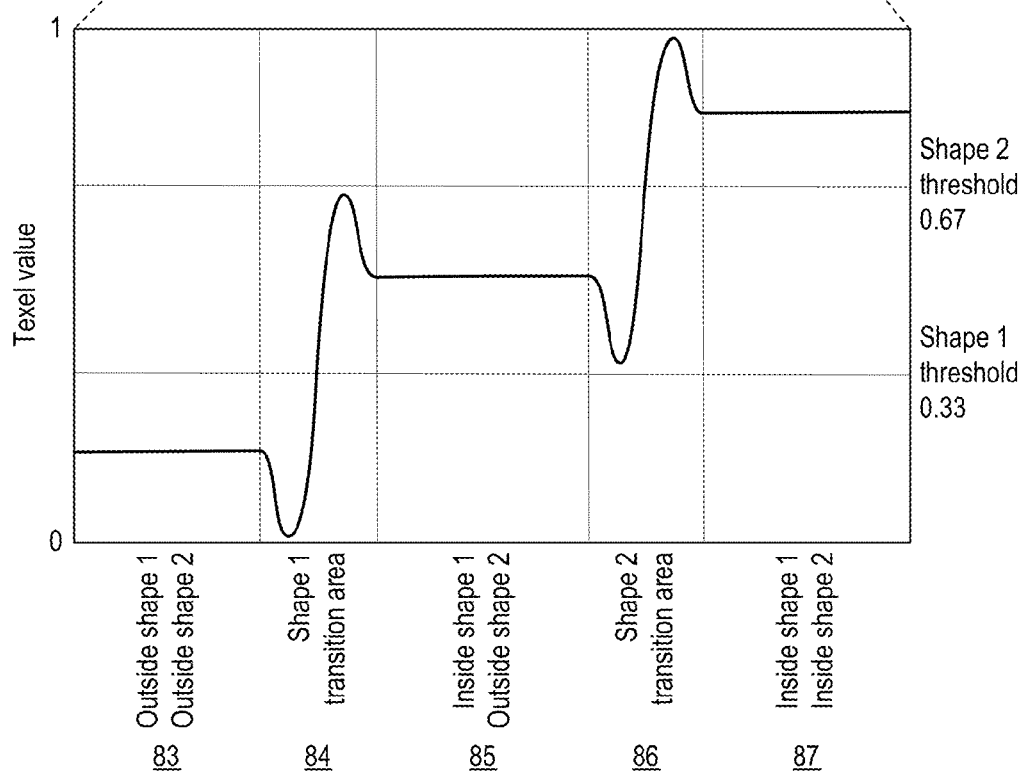

FIG. 8b illustrates this, and shows the progression of the texel values along the line a-a shown in FIG. 8a from left to right.

As shown in FIG. 8b, the texel values in the region 83 which is, in the present embodiment, considered to be outside both the smooth curves, are set to values which are lower than the threshold values of both the curves 80, 81 (i.e., in practice below the threshold value ⅓ of the lower threshold curve 80).

Then, in the "transition" region 84 around the line of the curve 80, the texel values vary around the threshold value ⅓ for the curve 80 so as to indicate the position of the curve 80 more accurately when the texture is sampled. However, as shown in FIG. 8b, these texel values do not exceed at any point the threshold value ⅔ for the curve 81 (so as to avoid false readings when sampling values for the purpose of drawing the curve 81).

This means that in practice, as shown in FIG. 9, the range of texel values available for denoting the line of the curve 80 is 0 to ⅔. This is two thirds of the full texel value range 0-1 that is available, so, in effect, 0.6 bits of precision are lost because of the presence of the second curve 81 in the texture. However, on the other hand, the number of texels needed to define the two curves is reduced (since, if the two curves were to be defined in different texture maps, twice as many texels would be required).

There is then a region 85 which lies between the two curves 80, 81, namely inside the first curve 80, and outside the second curve 81 in the present embodiment. In this case, the texel values within this region are set to a value that is between the threshold values of the two curves, so that those texels when sampled will appropriately indicate their positions relative to the two curves.

The "transition" region 86 that will be used to indicate the path of the curve 81 in the texture is then reached. Again, in this region the texel values vary over a range of values so as to indicate the position of the line of the curve 81 more accurately when the texture is sampled. However, again, the varying texel values in this region 86 are confined such that they do not fall below the threshold value of the curve 80. Thus, in effect, the range of texel values available for indicating the position of the line of the curve 81 in the region 86 is ⅓ to 1, as shown in FIG. 8b.

Finally, the region 87 which is, in the present embodiment, considered to inside both the curves 80 and 81 is reached. In this case the texel values in that region are simply set to values that are higher than both the threshold value of the curve 80 and the threshold value of the curve 81, so as to appropriately indicate that those positions are inside each curve when the texture is sampled.

The curves 80, 81 are also packed into the texture 82 in such a way that, as shown in FIG. 8a, the texels around the lines (paths) of the curves 80, 81 as they appear in the texture do not overlap each other. This also helps to avoid the representation of one curve affecting the sampling of the other curve.

It can be seen from FIGS. 8a and 8b that the two curves 80 and 81 are stored in the same texture space in the present embodiment by giving each curve different threshold levels, setting the texel values so that they are appropriately valued with respect to each curve's threshold value, and ensuring that the positions of the lines of the two curves do not actually overlap each other in the texture. In particular, it is possible to place the curves partially on top of each other in the texture so long as the texel values will not cross the curves' threshold values inappropriately, and the texels that will in practice define the lines (paths) of the curves do not overlap each other.

Although the arrangement illustrated in FIGS. 8a and 8b stores two curves 80, 81 in the texture, it would, of course, be possible to store more than two curves in a similar manner in a texture, and to use, for example, different ranges of texel values and different curve threshold values.

It would also be possible to use floating point format textures, rather than fixed point textures. Indeed, in the case of floating point textures where the floating point format has m bits of mantissa and e bits of exponent, then by setting the threshold value of each curve to $1.5 \times 2^n$, up to $2^e - 2$ curves can be stored on top of each other in the texture, each with approximately m bits of resolution (subject to also meeting any non-overlap requirements for the texels denoting (around) the lines of the curves in the texture). (In other words, by setting the threshold values to the mid-value in the exponent range when using floating point textures, the full mantissa precision can be maintained for denoting the line of each curve.)

The textures used in the present embodiment are, as will be discussed further below, optimised for sampling using bi-linear filtering.

(As is known in the art, bi-linear filtering is a way of interpolating values for positions in a texture map from the values assigned to texels of the texture map. It can be viewed as a convex combination of the four nearest texels to the sampling position with co-efficients derived from barycentric coordinates:

$$\text{bilinear}(s,t) = (1-s)(1-t)\text{texel}_{i,j} + s(1-t)\text{texel}_{i+1,j} + (1-s)t\text{texel}_{i,j+1} + st\text{texel}_{i+1,j+1}$$

where (s, t) are the coordinates of the sampling position in question and $\text{texel}_{i,j}$, etc., are the four closest texels to that position.)

As discussed above, the Applicants have recognised that by optimising the texture representing a curve for sampling using bi-linear filtering, the sampling process when the texture is used can and will produce a better representation of the curve in question.

The optimisation of the texture for use with bi-linear filtering is carried out in this embodiment by establishing for each curve that the texture is to represent, a cost function that includes the texel values of the texels that will in practice denote the position of the curve's contour in the texture as variables, and then attempting to minimise that cost function and selecting the texel values accordingly.

In the present embodiment, this cost function is generated by breaking the path (line) of the particular curve into a series of intersections of the path of the curve with lines joining respective texel centres and then trying to adjust the respective texel values so as to produce the desired curve threshold value at the intersection point of the curve with the line joining the two texel centres.

Figure 2:
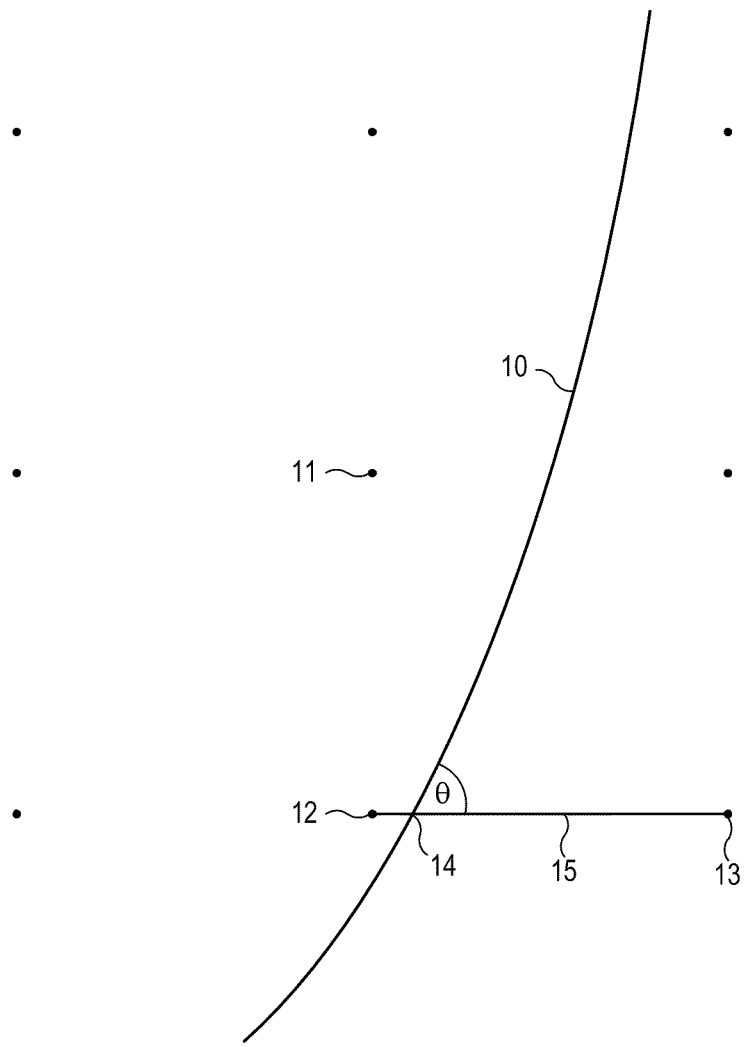
FIG. 2 shows schematically an embodiment of the derivation of the texel values to be used for the smooth curve of FIG. 1.

FIG. 2 illustrates this and shows an exemplary grid of texels 11 with a smooth curve 10 passing through them. If the texels 12, 13 are considered, then ideally their respective texel values should be set such that if the texture is bi-linearly sampled at the point 14 where the curve 10 intersects the line 15 joining the texels 12, 13, then the sampled texture value should exactly equal the threshold texture value for the curve (which may, e.g., be ⅓).

However, each texel may participate in more than one texel pair whose values need to be optimised in this manner for the curve in question, and so it may not always be possible to set the texel values to the exact values that would produce the desired result in respect of any given pair of texels.

The texel values to use for the texels denoting the curve's path are therefore determined by using a global cost function which is the sum of local cost functions determined in respect of each relevant texel pair (in practice each texel pair that straddles the path (line) of the curve in question (in practice this is also each texel pair that straddles the contour in the texture having the curve's threshold value)) and then using a global optimisation method to try and find a configuration that minimises the global (overall) error (for the curve in question), to try to find the optimum texel values to use.

The local cost function (the adjustment of the two texel values) for each respective texel pair is viewed in the present embodiment as a series of interconnected optimisation problems as follows.

First, as discussed above, one aim is to minimise the difference between the actual crossing point 14 of the curve on the line 15 joining the pair of texels, and the crossing point as determined by the texel values (i.e. the point on the line 15 where bi-linearly sampling values of the texels 12, 13 will give a sample value equal to the defined curve threshold value (in this case ⅓)). This factor is taken account of by including in the cost function the error between the actual crossing point position, and the position as indicated by the texel values.

Secondly, the cost function is configured so that the resulting differences in the texel values will reflect the angle θ at which the curve 10 crosses the line 15 joining the pair of texels. This is so as to try to ensure that if the curve 10 is perpendicular to the line 15, the difference between the texel values 12, 13 is the maximum it can be (given the range of values available for the curve in question) (⅔ in the present case) and if the curve 10 is almost parallel to the line 15, the difference between the texel values 12, 13 should be close to 0 (zero). This helps to ensure that the texels can be allocated (will use) the entire range of available texel values (0 to ⅔ in this case), thereby defining the curve with a higher resolution.

In the present embodiment, this is achieved by using the sine of the angle θ between the curve 10 and the line 15 joining the texels as a factor in the cost function.

Finally, it is less important to position the crossing point 14 for the curve 10 accurately where the curve is almost parallel to the line 15 between the texels (as any error in the crossing point when the texture is sampled will in this case be less detrimental). This is allowed for in the present embodiment by using a factor related to the square of the sine of the crossing angle θ to weight the edges in the cost function.

The cost function for each respective pair of texel values defined in this form is then summed over all the pairs of texel values being considered, to give a "global" or overall cost function for the curve in question.

This results in the present embodiment in a cost function of the form:

$$\text{cost} = \sum_{i=1}^{N} \left( w_1 \cdot \left| \frac{\text{wantedcrosspoint}_i - }{\text{bilinearcrossspoint}_i} \right| + w_2 \cdot |(\text{texel}_{ib} - \text{texel}_{ia}) - \sin\theta_i| \right) \cdot \sin^2\theta_i$$

where:

$w_1$ and $w_2$ are weighting values that can be selected and varied as desired, for example iteratively to test varying optimisations;

i is the texel pair for which the cost function is being tested;

N is the total number of texel pairs over which the cost function is evaluated and summed;

$\theta_i$ is the crossing angle of the curve for the ith texel pair;

$\text{texel}_{ia}$ and $\text{texel}_{ib}$ are the respective texel values for the texels of the ith texel pair;

$\text{wantedcrosspoint}_i$ is the point on the line joining the ith pair of texels where the true curve crosses; and $\text{bilinearcrosspoint}_i$ is the point on the line joining the ith pair of texels where the result of bilinear filtering with the given texel values will return the defined threshold curve value (in this case 0.5) and thus is:

$$\text{bilinearcrosspoint}_i = \frac{\text{threshold} - \text{texel}_{ia}}{\text{texel}_{ib} - \text{texel}_{ia}}$$

This equation is derived by solving threshold=bilinear(bilinearcrosspoint$_i$, 0) for bilinearcrosspoint$_i$.

In effect, in this cost function, the factor:

|wantedcrosspoint$_i$−bilinearcrosspoint$_i$| represents the absolute value of the difference between the crossing point of the curve as determined when the texel values are sampled, and the wanted crossing point of the curve;

the factor:

|texel$_{ib}$−texel$_{ia}$|−sin θ$_i$ ensures the full range of available texel values is used (prevents the solution from collapsing all the assigned texel values to the threshold value (0.5 in this case)); and the factor:

sin$^2$ θ$_i$ causes edges where the curve is almost parallel to the line between the texels to have less weight in the cost function (and vice-versa).

This cost function is then minimised to find the optimum texel values, texel$_{ia}$, texel$_{ib}$ to use for each texel pair that will indicate the position of the contour of the curve in the texture (in practice the texel pairs that straddle (span) the contour in the present embodiment). In the present embodiment this is done using simulated annealing, although other optimisation algorithms can be used if desired. The determined texel values are then stored in the graphics texture representing the smooth curve.

This is then repeated for each smooth curve that the texture is to represent, so that the texel values for the texels that will indicate the threshold value contours of each curve in the texture are suitably optimised for sampling using bi-linear filtering.

Since in the present embodiment the paths (the threshold value contour regions) for each curve in the texture do not overlap, any given texel cannot participate in indicating the position of more than one curve (threshold value contour) in the texture. This means that optimisation of any given curve's position (threshold value contour) in the texture will not affect any texels that will indicate the position of any other curves (threshold value contours) in the texture. Each curve can therefore be optimised independently.

It should also be noted here that it may be necessary to scale and bias the result of the optimisation (the derived texel values) so as to ensure that those values fit within the required minimum and maximum texel value range for representing a given curve. This is done in the present embodiment when necessary.

In the present embodiment, this process is repeated for plural sets of different smooth curves and/or parts of a given smooth curve, so as to build up a set of texture maps each representing a plurality of different smooth curves.

The smooth curves that are represented in a texture in the present embodiment comprise curves that are continuous and whose first derivatives are piecewise continuous. They may be, for example, bezier curves, spline curves, and/or arcs.

Textures that represent one or more reference or "canonical" curves are also generated and used. (As discussed above, a "canonical curve" is a reference or fundamental curve that all curves within a given family of curves can be transformed onto using an affine transformation.)

In the present embodiment, a texture map can be used to store texture representations of plural sets of plural different smooth curves and/or parts of smooth curves, by spatially separating the different sets of curves in the texture.

Figure 3:
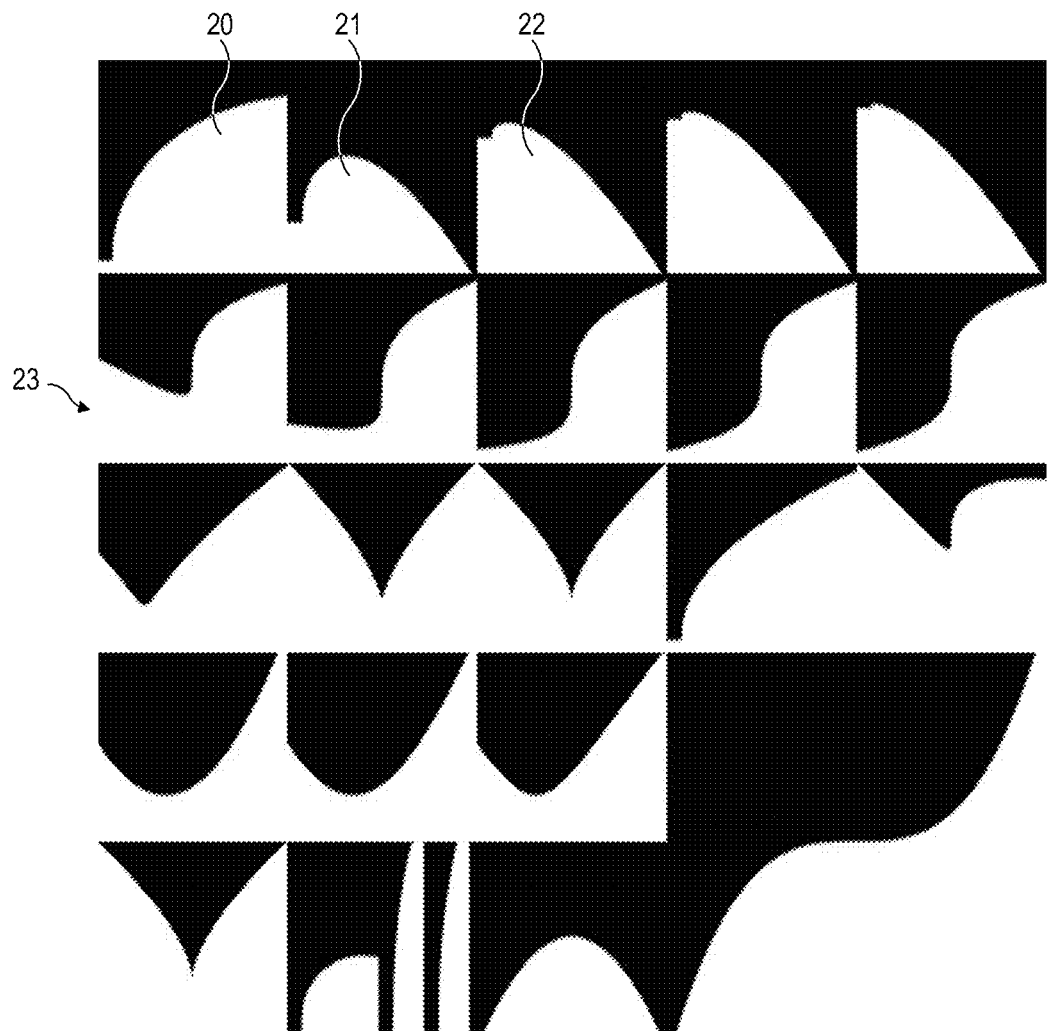
FIG. 3 shows schematically the storing of textures representing plural smooth curves in a single texture map.

FIG. 3 illustrates this in the case of textures representing single curves and shows plural smooth curves 20, 21, 22, etc., stored in a single overall texture 23. By sampling the appropriate region of the texture 23, the smooth curve represented there can be drawn. The same arrangement can be used where each section 20, 21, 22, etc. of the texture represents multiple curves in the manner of the present invention.

Storing textures representing different sets of smooth curves as different parts of the same texture map allows many sets of curves to be stored in a single texture, and can reduce, e.g., the number of texture changes needed to render smooth curves when using the present invention.

Indeed, the applicants have found that in practice most, if not all, smooth curve sections that may need to be drawn in graphics processing can be represented by relatively few families of curves, such that it is readily possible to represent all those desired curves using relatively few textures.

Once a set of textures representing sets of smooth curves has been generated in this manner, and stored for use by a graphics processing system, the textures can then be used to draw shapes defined by the smooth curves (i.e. shapes having curves corresponding to the smooth curves as their edges (boundaries)). This is basically done by generating primitives covering the scene (display) area where the shape is to be drawn and then applying the appropriate texture to the primitive to draw the shape.

When the texture is applied to the primitive, texture values are sampled for sampling points within the primitive and the sampled texture values used to conditionally draw (shade) the sample position as being inside the curve (i.e. in practice, inside the edge or boundary of the shape defined by the curve) (if the sampled texture value is less than the curve's threshold value or vice-versa) or discard the sample position as being outside the curve (shape) (if the sampled texture value is greater than or equal to the curve's threshold value or vice-versa).

Figure 5:
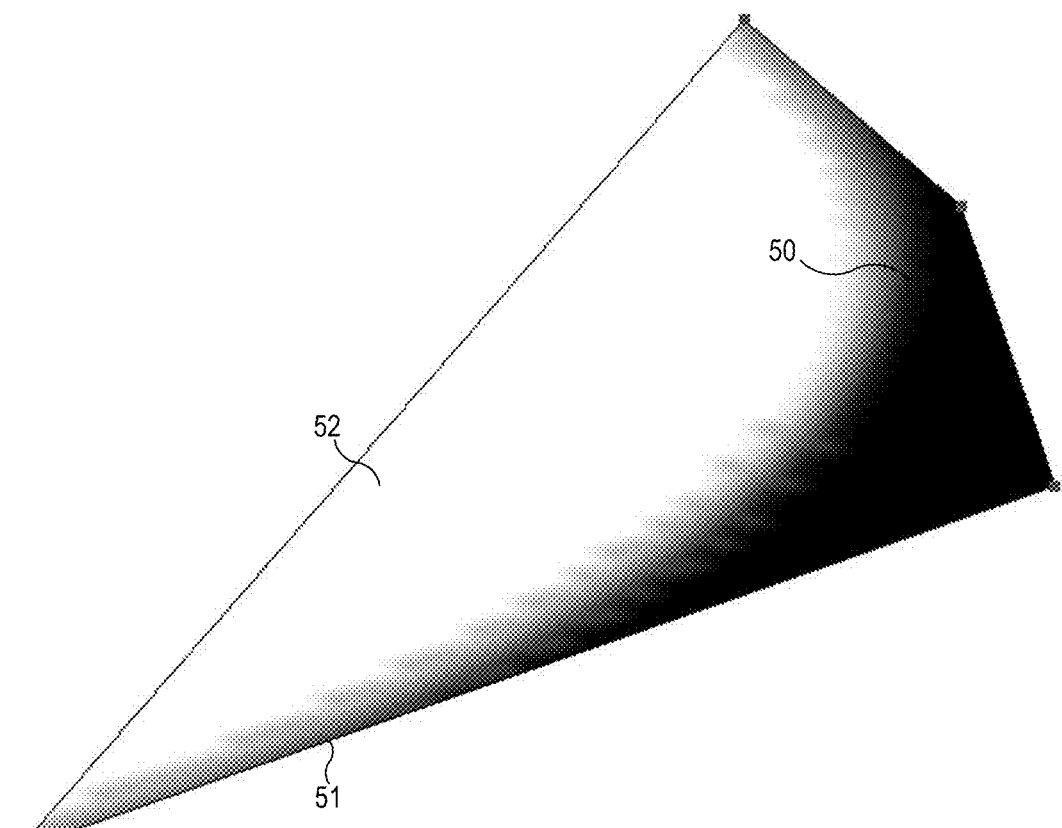
FIG. 5 shows schematically the application of a texture such as that shown in FIG. 1 to a graphics primitive.

FIG. 5 illustrates this and shows schematically the application of a texture representing a curve 50 to a primitive 51. In this case the lighter coloured region 52 of the primitive 51 is drawn as falling inside the curve 50.

A preferred embodiment of the process for rendering a shape using a texture in the present embodiment will now be described in more detail.

Firstly, the graphics processing system identifies the need to render a "smooth" shape. It then generates in the normal fashion a primitive or primitives that cover the screen area where the shape is to be displayed. In the present embodiment, triangles that cover the convex hull of the control points of the curve defining the edge of the shape to be drawn are generated.

These primitives are then rasterised in the normal manner to fragments that are passed to the shading pipeline for shading. (If, as can happen, rasterising the primitives doesn't generate any fragments (as the primitives don't in fact cover any sampling points of the scene as it will be displayed), then the process can stop here, as this means that the shape will not actually be seen in the scene as it will be displayed.)

The texture map (or part of the texture map) that corresponds to the smooth curve defining the edge of the shape to be drawn is then applied to the primitive or primitives by, as is known in the art, taking texture samples from the texture representing the smooth curve for the positions of the sampling point or points in the scene that the primitive(s) covers. In the present embodiment, a single texture look-up is done per fragment. (Other arrangements would, of course, be possible.)

Each sampled texture value is then compared to the threshold texture value defined for the curve in question and the sample position then either drawn (rendered) as falling inside the curve (and thus shape) or discarded as falling outside the curve, in dependence on the result of the comparison. The texture samples are taken using bi-linear filtering (with bi-linearing filtering enabled), as the texture map is, in this embodiment, as discussed above, tailored to sampling using bi-linear filtering.

The comparison of the sampled texture value and the curve threshold value can be performed in a graphics processing system that has programmable fragment shader hardware using a compare and conditional discard routine, for example with the conditional discard test set to the threshold for the curve in question (e.g.: if (gl_FragColor.a<threshold) discard).

In fixed-function graphics hardware the comparison of the sampled texture value and the curve threshold value can be performed using the graphics "alpha test", with the comparison alpha value for the alpha test set to the curve threshold value (in this case, e.g., ⅓), so as to discard sampling points and/or fragments that fall outside the curve.

When using the alpha test for this purpose, if the alpha test must be carried out against a fixed comparison value, e.g., 0.5, for an entire draw call (which may typically be the case, as is known in the art), then in order to test appropriately against the actual threshold value for the curve in question (which may not equal the value set for the alpha test for the draw call), a bias or offset is added to or subtracted from the sampled texture values to allow for the fact that the alpha test will not test the sampled values against the curve's threshold value, but will test them against the alpha value set for the draw call.

In other words, in the present embodiment, where an alpha test is used, the sampled texture values are if necessary adjusted to allow for the fact that they will not be compared with the actual threshold value of the curve in question (where that will be the case) so as to, in effect, "move" the sampled texture values by the same amount as the curve's threshold value has to be moved to set it to the alpha value that will be used in the alpha test (i.e. the alpha value set for the draw call).

For example, for a curve with a threshold value of ⅓ but where the alpha test is set to 0.5, each sampled texture value should have (0.5−(1.0/3.0)) added to it, before it input to the alpha test, to bias (offset) the sampled texture value appropriately for comparison with the draw call alpha value of 0.5, rather than the curve's threshold value of ⅓.

In the present embodiment, a greater than or equal to (>=) test is used for the compare and discard test. The results of this test are then stored in the stencil buffer and used when applying shading to draw the curve in a later processing pass. (It would, of course, equally be possible to do the shading in the same pass as the curve testing.)

As will be appreciated by those skilled in the art, there may be situations where the shape (the curve defining the edge of the shape) to be drawn does not match exactly to a curve as it is stored in a texture. In this case, the shape (curve) to be drawn must be mapped to the curve as it is stored in the texture, so that the texture representing the curve can then be applied (sampled) appropriately. Similarly, the sampling positions within the image being rendered must be mapped to appropriate sampling positions within the texture representing the curve, again so that the shape (curve) can be drawn correctly.

In the present embodiment, the process of mapping the curves inscribed in textures onto the image to be displayed is done by calculating the texture coordinates for the control points defining the curve of the input shape to be drawn and then linearly interpolating the texture coordinates over the curve using the interpolation hardware of the graphics processor.

In the case of a quadratic curve, each input curve should be just an affine transformed version of the curve stored in the texture. Thus, in the present embodiment the entire curve is used each time, so that fixed texture coordinates can be used for each of the control points, and the necessary transform implicitly defined by pairing control points in surface space with the texture coordinates (in texture space).

For cubic curves, the curve is preferably first classified as a serpentine, loop, cusp, "cusp-at-infinity" (i.e. a curve with a cusp with an inflation point infinitely far away), degenerate, or parabola curve. A parabola curve is a quadratic curve and is handled as such. A degenerate curve is handled by splitting it into one or more lines.

For the other curves, the inflection points (infl0 and infl1) of the curve are calculated. The stored curves (textures) are configured so that their inflection points are always at −1 and 1, and so the linear transformation from [infl0 . . . infl1]→[−1 . . . 1] can be calculated. With this, the parametric location of the start and end point (0 and 1) of the input curve can be transformed to their locations in the texture space. The parametric range in the canonical texture space that the texture needs to cover is now known.

For loop curves and serpentine curves, the stored textures are then searched to find a texture (e.g. the most zoomed-in texture) that covers the parametric range needed. (This is not necessary for cusp and cusp-at-infinity curves.)

The selected stored curve (texture) (with inflection points at −1 and 1) is then rescaled to map the inflection points to the inflection points of the input curve infl0 and infl1. This transformation is then applied to the control points of the stored curve to give the appropriate transformed control point positions, which are then used as texture coordinates for the corresponding control points of the input curve.

Where multiple sets of curves are spatially packed into a texture, it may be necessary to apply a transformation to the texture coordinates so as to sample the correct spatial subset (region) of the texture. This is done in the present embodiment by calculating the scaling and translation required to transform the box [0 . . . 1]×[0 . . . 1]→[u_1 . . . u_2]×[v_1 . . . v_2] and applying the transformation to texture coordinates that have been calculated as if the curve covered the entire texture.

Figure 6:
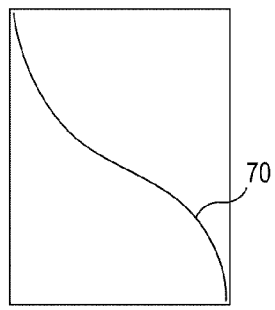
FIG. 6 shows schematically the rendering of a smooth curve for display in an embodiment of the present invention.
Figure 6:
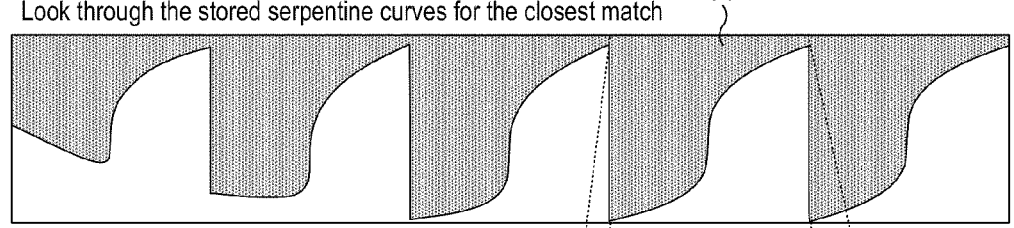
Figure 6:
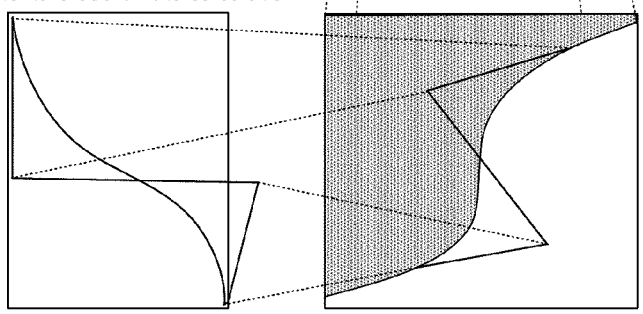
Figure 6:
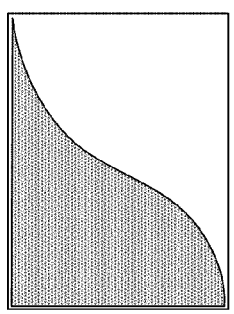

FIG. 6 illustrates these processes, and shows schematically the moving of a curve defining a shape to be drawn through classification, texture search, texture coordinate calculation and rendering stages.

As shown in FIG. 6, a given input smooth curve defining a shape to be drawn 70 is first classified at step a). In this example, the classification identifies the curve as a "serpentine curve".

The system then searches through the stored textures 71 representing serpentine curves to find the stored serpentine curve with the closest match to the input curve 70 (step b)). This search should identify (and return) the texture coordinates where that curve lies (the region of a texture where that curve lies) and the threshold value for the curve.

Once this is done, the necessary texture coordinate calculation and primitive generation to map the input curve 70 to the stored curve in the texture 71 is carried out as shown at step c) in FIG. 6.

Finally, the input curve is rendered using the selected texture as shown at step d) in FIG. 6.

In the present embodiment, it is also possible to split a given input curve (shape) to be drawn into separate sections, with each section then being drawn separately (e.g. using different textures or different parts of the same texture). This may be done for a bezier curve, for example, using de Casteljau's algorithm. Other suitable algorithms could, of course, be used if desired.

In the present embodiment, such splitting of a shape (curve) to be drawn is done when drawing very large shapes, so as to split them into smaller shapes in order to reduce rendering artefacts. Similarly, self-intersecting shapes, such as shapes defined by curves with loops in them, are split into two (or more) shapes that are not self-intersecting, which shapes are then drawn (rendered) separately.

Such splitting of a curve (shape) to be drawn is also done to split curves that have singular points (cusps), at the singular points, so as to avoid the singular points in the curves causing rendering errors.

Figure 7:
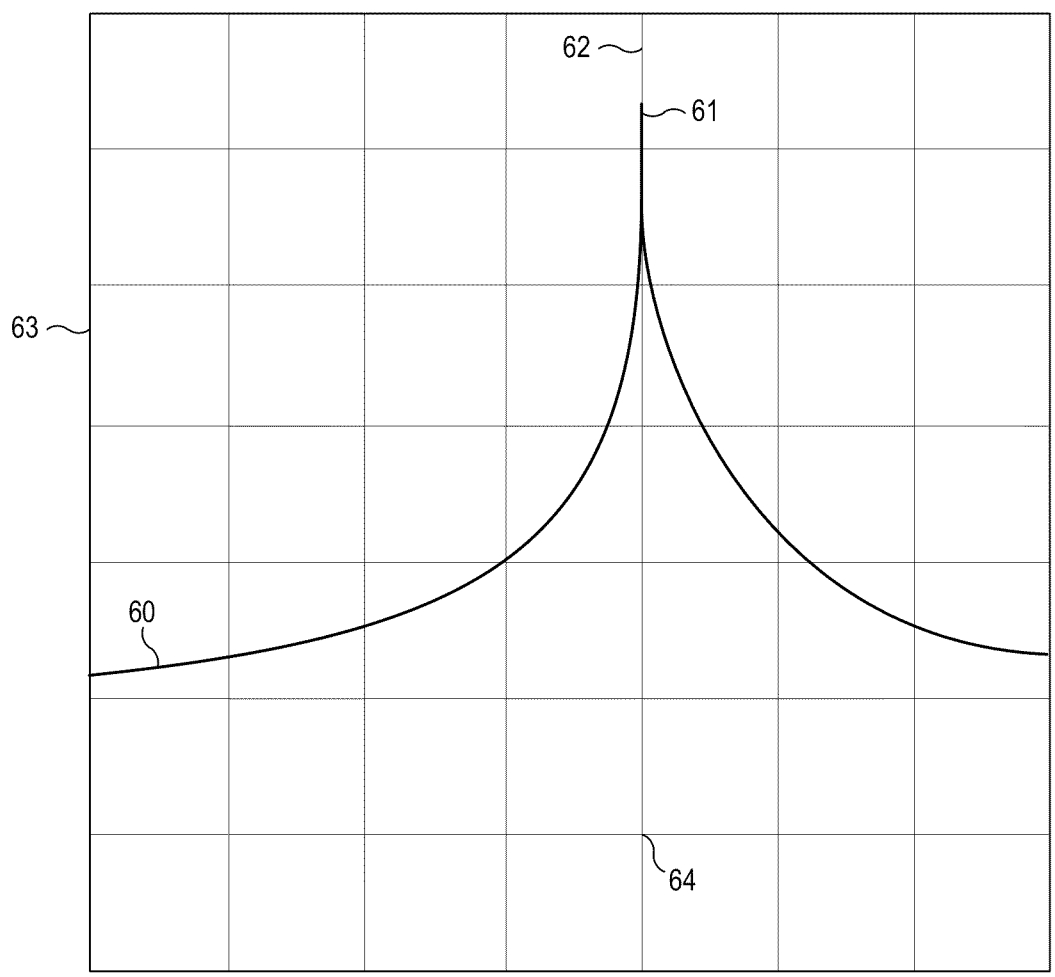
FIG. 7 shows schematically the representation of a curve containing a cusp in a graphics texture in one embodiment of the present invention.

(An alternative mechanism for improving the handling of singular points in curves is to ensure that when the curve is represented in the texture, all the singular points fall on the grid of horizontal and vertical lines that join the texels. FIG. 7 illustrates this and shows a cusp curve 60 represented in a texture 63 such that the singular point 61 of the cusp lies on the grid line 62 joining the centres 64 of the texels.)

As discussed above, and as will be appreciated from the above, the effect of rendering a smooth curve in the manner of the present invention is to draw a shape that has the curve as its edge or boundary (since points on one side of the curve are drawn (rendered) differently to points on the other side of the curve). For example, as can be seen from FIG. 8, textures that are used in the present invention can be viewed as representing shapes that have the curves in question as their edge or boundary or contour.

The present embodiment and invention therefore can effectively be considered to render shapes that have the relevant curves as their edge or boundary, and/or that have the relevant curves as a contour or boundary (i.e. such that points on different sides of the curve should be drawn differently).

Although the present embodiment has been described above with particular reference to the use of textures to represent multiple smooth curves and smooth shapes for rendering in graphics processing systems, the Applicants have recognised that it would also be possible to use the principles of the present invention to store other data that can be represented in the form of curves, contour lines, and smooth shapes in similar data structures in a similar manner.

It can be seen from the above that the present invention, in its preferred embodiments at least, provides a method and system for the effective rendering of shapes having smooth curves as their edge (boundary) that can be used, inter alia, on lower-cost, fixed function 3D graphics hardware and on unmodified, existing hardware graphics accelerators. This allows, for example, newer curve rendering APIs and applications to be hardware-accelerated using lower cost, and/or fixed function graphics hardware.

Thus, the present invention can be implemented using only "basic" graphics hardware. It also uses significantly less CPU time and rendering bandwidth, and thus power, when compared, e.g., to existing sub-division approaches for rendering smooth curves.

This is achieved, in the preferred embodiments of the present invention at least, by representing smooth curves as graphics textures and then using graphics texture mapping to render shapes defined by the curves.

Moreover, the present invention provides a particularly efficient mechanism for doing this, by packing multiple texture-based smooth curve descriptions into a single texture map (using a single set of texels) thereby, inter alia, increasing the efficiency of the way the curves are stored in the texture. Thus multiple curve representations are packed into a single two-dimensional texture, thereby saving on texture space and texture bandwidth.

This is achieved, in the preferred embodiments of the present invention at least, by arranging representations of multiple curves in the texture with each curve having a different threshold level for indicating the inside or outside of the curve, and, preferably, by ensuring that the texels indicating the lines of each curve do not overlap each other in the texture.

The invention claimed is:

1. A method of rendering, by one or more processors, a shape defined by a smooth curve in a graphics processing system, the method comprising:
applying, by the one or more processors, a graphics texture representing a curve corresponding to the curve defining the shape to at least one primitive to be rendered by sampling texture values for sampling positions within the at least one primitive, the texture representing two smooth curves by all texture positions on one side of a first curve that the texture represents returning sampled texture values that are less than a first threshold value, and all texture positions on the other side of that curve returning sampled texture values that are greater than the first threshold value, and by all texture positions on one side of a second curve that the texture represents returning sampled texture values that are less than a second, different threshold value, and all texture positions on the other side of that curve returning sampled texture values that are greater than the second threshold value;
comparing, by the one or more processors, the sampled texture values for the sampled sampling positions of the at least one primitive to the selected threshold texture value for the curve that corresponds to the curve defining the shape to be rendered to determine which side of the curve the sampled sampling positions of the at least one primitive are on; and
shading the sampling positions of the at least one primitive in accordance with the results of the determination of which side of the curve the sampling positions are on.

2. The method of claim 1, wherein the texture represents more than two smooth curves.

3. The method of claim 1, wherein different sets of texels are used to indicate the threshold value contours of each different curve that the texture represents.

4. The method of claim 1, wherein the threshold values for each curve that the texture represents are spaced equally within and across the overall range of texel values available for the texture.

5. The method of claim 1, wherein at least some of the texel values of the texture representing the smooth curves are tailored for sampling with a particular texture sampling process.

6. One or more non-transitory, computer-readable storage media comprising computer software code to perform the method of rendering a shape defined by a smooth curve as claimed in claim 1 when executed on a data processor of a graphics processing system.

7. A method of generating a texture, by one or more processors, for use in a graphics processing system for rendering a shape defined by a smooth curve, the method comprising:
generating, by the one or more processors, a graphics texture map comprising an array of texture texels for representing at least two smooth curves, by:
setting, by the one or more processors, the texel values of the texture such that texture samples taken from positions in the texture map that lie on one side of a first smooth curve that the texture is to represent as it appears in the texture return texture values that are less than a first threshold texture value, and such that texture samples taken from positions that lie on the other side of that smooth curve in the texture return texture values that are greater than the first threshold texture value, and such that texture samples taken from positions in the texture map that lie on one side of a second smooth curve that the texture is to represent as it appears in the texture return texture values that are less than a different, second threshold texture value, and such that texture samples taken from positions that lie on the other side of that smooth second curve in the texture return texture values that are greater than the second threshold texture value.

8. One or more non-transitory, computer-readable storage media comprising computer software code to perform the method of generating a texture for use in a graphics processing system as claimed in claim 7 when executed on a data processor.

9. An apparatus for rendering a shape defined by a smooth curve in a graphics processing system, the apparatus comprising:

memory for storing at least one graphics texture that represents at least two smooth curves, each texture represents at least two smooth curves by all texture positions on one side of a first curve that the texture represents returning sampled texture values that are less than a first threshold value, and all texture positions on the other side of that curve returning sampled texture values that are greater than the first threshold value, and by all texture positions on one side of a second curve that the texture represents returning sampled texture values that are less than a second, different threshold value, and all texture positions on the other side of that curve returning sampled texture values that are greater than the second threshold value;

processing circuitry arranged to apply a stored texture representing at least two smooth curves to at least one primitive to be rendered to render a shape defined by a curve corresponding to one of the smooth curves for display by sampling texture values of the stored texture for sampling positions within the at least one primitive; and processing circuitry arranged to compare the sampled texture values for the sampled sampling positions of the at least one primitive to the threshold texture value for the one of the curves that the texture represents that corresponds to the curve defining the shape to be rendered to determine which side of that curve the sampling positions of the at least one primitive are on.

10. The apparatus of claim 9, wherein the texture represents more than two smooth curves.

11. The apparatus of claim 9, wherein different sets of texels are used to indicate the threshold value contours of each different curve that the texture represents.

12. The apparatus of claim 9, wherein the threshold values for each curve that the texture represents are spaced equally within and across the overall range of texel values available for the texture.

13. The apparatus of claim 9, wherein at least some of the texel values of the texture representing the smooth curves are tailored for sampling with a particular texture sampling process.

14. The apparatus of claim 9, further comprising processing circuitry further arranged to shade the sampling positions of the at least one primitive in accordance with the results of the determination of which side of the curve the sampling positions are on.

15. An apparatus for generating a texture for use in a graphics processing system for rendering a shape defined by a smooth curve, the apparatus comprising:

processing circuitry arranged to generate a graphics texture map comprising an array of texture texels for representing two smooth curves, comprising:

processing circuitry arranged to set the texel values of the texture such that texture samples taken from positions in the texture map that lie on one side of a first smooth curve that the texture is to represent as it appears in the texture return texture values that are less than a first threshold texture value, and such that texture samples taken from positions that lie on the other side of that smooth curve in the texture return texture values that are greater than the first threshold texture value, and such that texture samples taken from positions in the texture map that lie on one side of a second smooth curve that the texture is to represent as it appears in the texture return texture values that are less than a second, different threshold texture value, and such that texture samples taken from positions that lie on the other side of that second smooth curve in the texture return texture values that are greater than the second threshold texture value.

\* \* \* \* \*